US012700880B2

(12) United States Patent
Rajamani et al.

(10) Patent No.: US 12,700,880 B2
(45) Date of Patent: Aug. 4, 2026

(54) DIGITAL PRE-DISTORTION (DPD) ADAPTATION FLOW AND ACCOMPANYING INTERFACES IMPLEMENTED IN A PROGRAMMABLE PROCESSING ARRAY

(71) Applicant: Intel Corporation, Santa Clara, CA (US)

(72) Inventors: Kannan Rajamani, Basking Ridge, NJ (US); Kameran Azadet, San Ramon, CA (US); Kevin Kinney, Coopersburg, PA (US); Thomas Smith, Colmar, PA (US); Zoran Zivkovic, Hertogenbosch (NL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/147,829

(22) Filed: Dec. 29, 2022

(65) Prior Publication Data

US 2024/0220445 A1    Jul. 4, 2024

(51) Int. Cl.
| | |
|---|---|
| *H04B 1/04* | (2006.01) |
| *H04L 25/03* | (2006.01) |
| *G06F 9/50* | (2006.01) |
| *G06F 9/54* | (2006.01) |
| *G06F 15/80* | (2006.01) |

(52) U.S. Cl.
CPC ..... *H04B 1/0475* (2013.01); *H04L 25/03343* (2013.01); *G06F 9/5027* (2013.01); *G06F 9/54* (2013.01); *G06F 15/80* (2013.01); *H04B 2001/0425* (2013.01)

(58) Field of Classification Search
CPC .......... H04B 1/0475; H04B 2001/0425; H04L 25/03343; G06F 9/5027; G06F 9/54; G06F 15/80; G06F 15/8007
USPC .................................. 455/126; 375/296, 297
See application file for complete search history.

(56) References Cited

U.S. PATENT DOCUMENTS

| | | | | |
|---|---|---|---|---|
| 2001/0005402 A1* | 6/2001 | Nagatani | ............... | H03F 1/3247 375/296 |
| 2008/0243899 A1* | 10/2008 | Staudinger | ............ | H04L 27/368 707/999.102 |
| 2009/0111399 A1* | 4/2009 | Norris | ....................... | H03F 1/34 455/114.3 |
| 2014/0072075 A1* | 3/2014 | Cai | ....................... | H03F 1/3241 375/297 |
| 2019/0303347 A1* | 10/2019 | Bilski | ................. | G06F 13/1663 |

* cited by examiner

*Primary Examiner* — Don N Vo
(74) *Attorney, Agent, or Firm* — Banner & Witcoff, Ltd.

(57) ABSTRACT

Techniques are disclosed for the use of a hybrid architecture that combines a programmable processing array and a hardware accelerator. The hybrid architecture functions to maintain synchronization between data samples to be transmitted, feedback data samples measured from an observed previous transmission of data samples, and output data samples that comprise the data samples from previous data transmissions, which may include data samples prior to or after the application of DPD terms. The architecture enables synchronization amongst several transmission channels, and provides for high flexibility with respect to timing flows and the movement and processing of data blocks.

22 Claims, 14 Drawing Sheets

DIGITAL PRE-DISTORTION (DPD) ADAPTATION FLOW AND ACCOMPANYING INTERFACES IMPLEMENTED IN A PROGRAMMABLE PROCESSING ARRAY

TECHNICAL FIELD

The disclosure generally relates to a hybrid hardware accelerator and programmable processing array architecture and, in particular, to an interface implemented in a hybrid hardware accelerator and programmable processing array architecture to facilitate digital pre-distortion (DPD) coefficient adaptation.

BACKGROUND

In many applications such as digital front end (DFE) radios, there is a need for fast computations to ensure that the digital data is transmitted and received efficiently. This may include the calculation of digital pre-distortion (DPD) coefficients or other terms used for digital communications, which require fast and accurate processing as data is transmitted and/or received as part of a data stream.

Programmable solutions for DFE radios provide flexibility to adapt the manner in which such computations are performed, but are inefficient in terms of cost and power. For instance, hardwired application specific integrated circuit (ASIC) solutions may be implemented in current DFE radio products, as ASICs are power and cost efficient, but lack the flexibility provided by programmable processing arrays. Programmable processing arrays, on the other hand, are implemented as a programmable array of cores, which are also referred to as processing elements (PEs). Although programmable processing arrays are flexible in their implementation, they are computationally intensive and thus inefficient in terms of power, and are less cost-effective. In other words, although fully soft DFE implementations provide flexibility, such solutions are not feasible as a significant amount of processing power is consumed via such computations.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the implementations as discussed herein.

FIG. 7A illustrates a first timing diagram with respect to the adaptation of DPD parameters via a programmable processing array, in accordance with the disclosure;

The present disclosure will be described with reference to the accompanying drawings. The drawing in which an element first appears is typically indicated by the leftmost digit(s) in the corresponding reference number.

DETAILED DESCRIPTION

Figure 1:
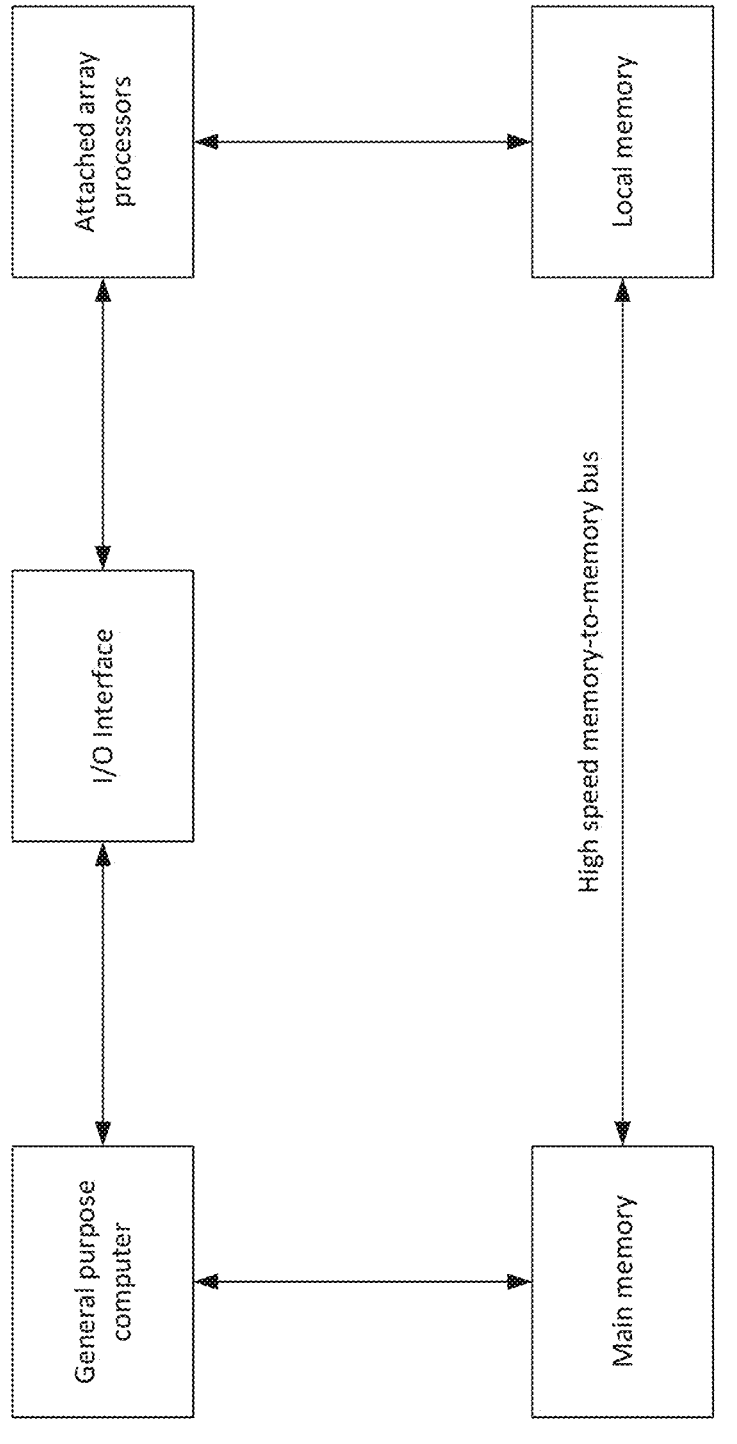
FIG. 1 illustrates an example of a conventional vector processor architecture.

In the following description, numerous specific details are set forth in order to provide a thorough understanding of the present disclosure. However, it will be apparent to those skilled in the art that the implementations of the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Programmable Processing Array Operation

The programmable processing arrays as discussed in further detail herein may be implemented as vector processors or any other suitable type of array processors, of which vector processors are considered a specialized type. Such array processors may represent a central processing unit (CPU) that implements an instruction set containing instructions that operate on one-dimensional arrays of data referred to as data "vectors." This is in contrast to scalar processors having instructions that operate on single data items. Vector processors can greatly improve performance on certain workloads, notably numerical simulation and similar tasks, by utilizing a number of execution units, which are alternatively referred to herein as cores, execution units processing units, functional units, or processing elements (PEs), and which independently execute specific functions on incoming data streams to achieve a processing flow.

Generally speaking, conventional CPUs manipulate one or two pieces of data at a time. For instance, conventional CPUs may receive an instruction that essentially says "add A to B and put the result in C," with 'C' being an address in memory. Typically, the data is rarely sent in raw form, and is instead "pointed to" via passing an address to a memory location that holds the actual data. Decoding this address and retrieving the data from that particular memory location takes some time, during which a conventional CPU sits idle waiting for the requested data to be retrieved. As CPU speeds have increased, this memory latency has historically become a large impediment to performance.

Thus, to reduce the amount of time consumed by these steps, most modern CPUs use a technique known as instruction pipelining in which the instructions sequentially pass through several sub-units. The first sub-unit reads and decodes the address, the next sub-unit "fetches" the values at those addresses, while the next sub-unit performs the actual mathematical operations. Vector processors take this concept even further. For instance, instead of pipelining just the instructions, vector processors also pipeline the data itself. For example, a vector processor may be fed instructions that indicate not to merely add A to B, but to add all numbers within a specified range of address locations in memory to all of the numbers at another set of address locations in memory. Thus, instead of constantly decoding the instructions and fetching the data needed to complete each one, a vector processor may read a single instruction from memory. This initial instruction is defined in a manner such that the instruction itself indicates that the instruction will be repeatedly executed on another item of data, at an address one increment larger than the last. This allows for significant savings in decoding time.

Figure 2:
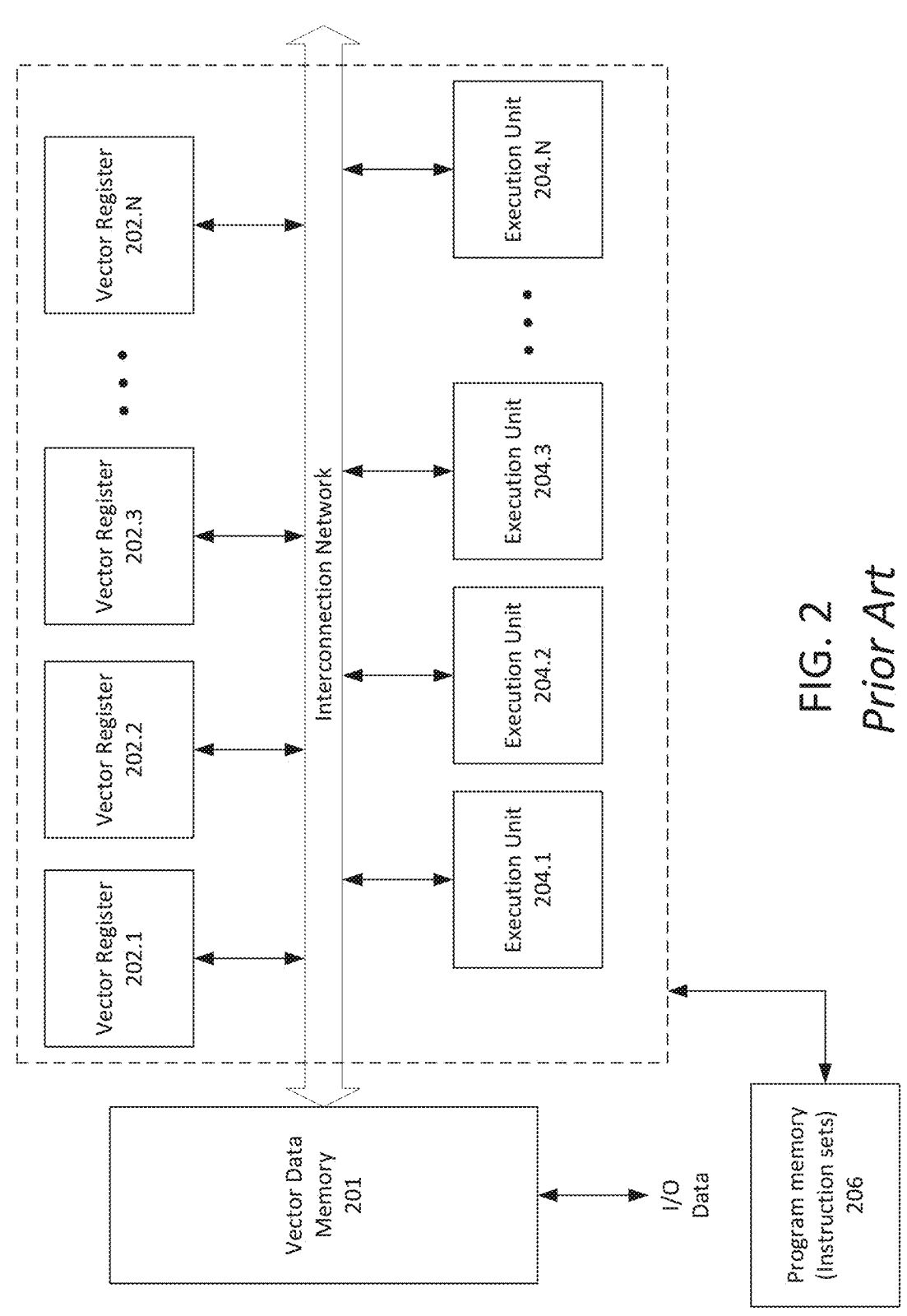
FIG. 2 illustrates another example of a conventional vector processor architecture.

Vector processors may be implemented in accordance with various architectures, and the various programmable array processor architectures as discussed throughout the disclosure as further described herein may be implemented in accordance with any of these architectures or combinations of these architectures, as well as alternative processing array architectures that are different than vector processors. FIGS. 1 and 2 provide two different implementations of a vector processor architecture. FIG. 1 illustrates an attached vector processor, which is attached to a general purpose computer for the purpose of enhancing and improving the performance of that computer in numerical computational tasks. The attached vector processor achieves high performance by means of parallel processing with multiple functional units.

FIG. 2, on the other hand, shows an example of a single instruction stream, multiple data streams (SIMD) vector processor. The vector processor architecture 200 as shown in FIG. 2 may have an architecture consisting of one or more execution units. Each execution unit is capable of executing one instruction. Each instruction can be a control, load/store, scalar, or a vector instruction. Therefore, a processor architecture with N execution units 204.1-204.N as shown in FIG. 2 can issue as many as N instructions every clock cycle. The execution units 204.1-204.N function under the control of a common control unit (such as processing circuitry), thus providing a single instruction stream to control each of the execution units 204.1-204.N. The I/O data as shown in FIG. 2 is typically identified with data communicated between the vector processor 200 and another data source or processor (which may be the common control unit or another processor), depending upon the particular application. The vector data memory 201 thus stores data received as input to be processed by the execution units 204.1-204.N, and data that is output or read from the vector data memory 201 after the data is processed. The vector processor architecture 200 as shown in FIG. 2 is an example of a load-store architecture used by vector processors, which is an instruction set architecture that divides instructions into two categories: memory access (loading and storing data between the vector data memory 201 and the vector registers 202.1-202.N) and the vector processing operations performed by the execution units 204.1-204.N using the data retrieved from and the results stored to the vector registers 202.1-202.N.

Thus, the load-store instruction architecture facilitates data stored in the vector data memory 201 that is to be processed to be loaded into the vector registers 202.1-202.N using load operations, transferred to the execution units 204.1-204.N, processed, written back to the vector registers 202.1-202.N, and then written back to the vector data memory 201 using store operations. The location (address) of the data and the type of processing operation to be performed by each execution unit 204.1-204.N is part of an instruction stored as part of the instruction set in the program memory 206. The movement of data between these various components may be scheduled in accordance with a decoder that accesses the instructions sets from the program memory, which is not shown in further detail in FIG. 2 for purposes of brevity. The interconnection network, which supports the transfer of data amongst the various components of the vector processor architecture 200 as shown in FIG. 2, is generally implemented as a collection of data buses and may be shared among a set of different components, ports, etc. In this way, several execution units 204.1-204.N may write to a single vector register 202, and the data loaded into several vector registers 202.1-202.N may be read by and processed by several of the execution units 204.1-204.N.

The use of instruction sets in accordance with the vector processor architecture 200 is generally known, and therefore an additional description of this operation is not provided for purposes of brevity. Regardless of the particular implementation, vector processors can greatly improve performance on certain workloads but have various drawbacks. For instance, and as noted above, vector processors may form part of what is referred to herein as a programmable processing array, which are traditionally computationally intensive, expensive, and suffer from power inefficiencies. As a result, such programmable vector processors may not be ideal for mobile or base station applications that implement DFE architectures. Furthermore, and as noted above, hardwired ASIC solutions are fast and efficient in terms of power consumption, but lack the flexibility provided by the programmable nature of the vector arrays.

Overview of Hybrid Architectures and Digital Front End (DFE) Functions

It is noted that current products such as DFEs typically implement either programmable or hardware-based solutions, each resulting in the tradeoffs as noted above. For instance, and as shown in FIG. 3A, DFEs may implement a hardwired ASIC to perform DFE functions such as DPD calculations, which may include the calculation of DPD parameters. As further discussed below, DPD calculations are typically performed by sampling data at specific locations within an RF chain, such as at the output of the power amplifier (PA) that is coupled to the antenna. The sampled measurements are then used as feedback to calculate DPD terms that are applied to subsequent data stream transmissions to compensate for various non-idealities such as non-linearities, memory effects, etc., of the RF chain components. Thus, a hardwired ASIC in such implementations represents a customized and optimized hardware solution that performs specific types of calculations, such as DPD calculations, in accordance with the specific set of operating parameters of the DFE. As a result, although such hardware ASIC solutions are fast and efficient in terms of power, these architectures lack flexibility and typically cannot be adapted to other DFEs or applications.

Figure 3B:
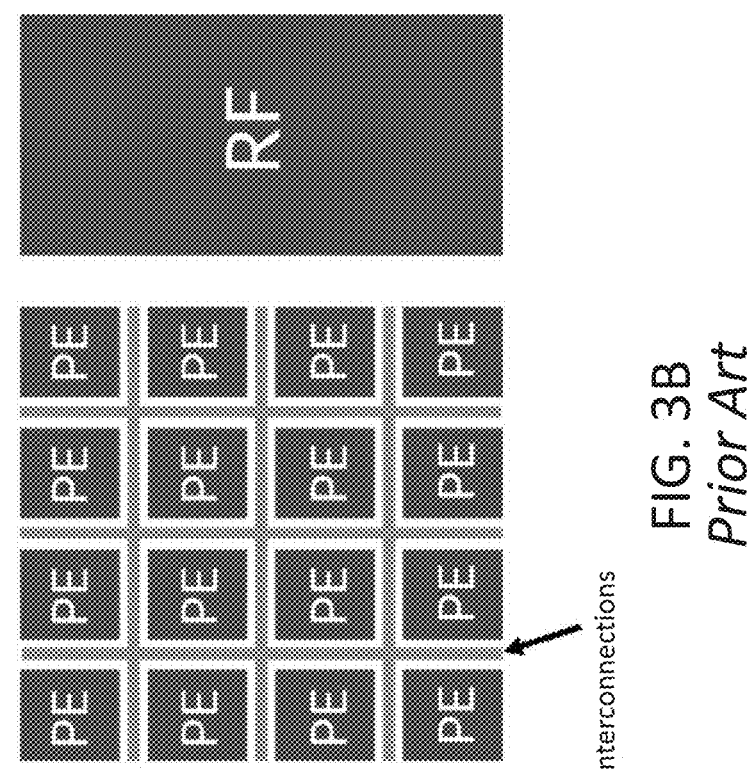
FIG. 3B illustrates a conventional programmable processing array for performing digital front end (DFE) functions.
Figure 3A:
FIG. 3A illustrates a conventional hardwired solution for performing DFE functions.

Thus, other solutions for performing DFE functions include the use of programmable arrays as shown in FIG. 3B. Such solutions are typically field programmable gate arrays (FPGAs) or a mesh of processors with interconnections connecting the programmable processing elements (PEs), which provide some flexibility to adapt how the DFE functions are performed across different products. Thus, such solutions also function to sample data at specific locations within an RF chain, but alternatively implement the use of the PEs to perform the DPD calculations. As a result, such solutions provide flexibility to adapt the manner in which DPD calculations are performed, but do so using increased power and added cost compared to hardwired ASIC solutions.

Figure 3C:
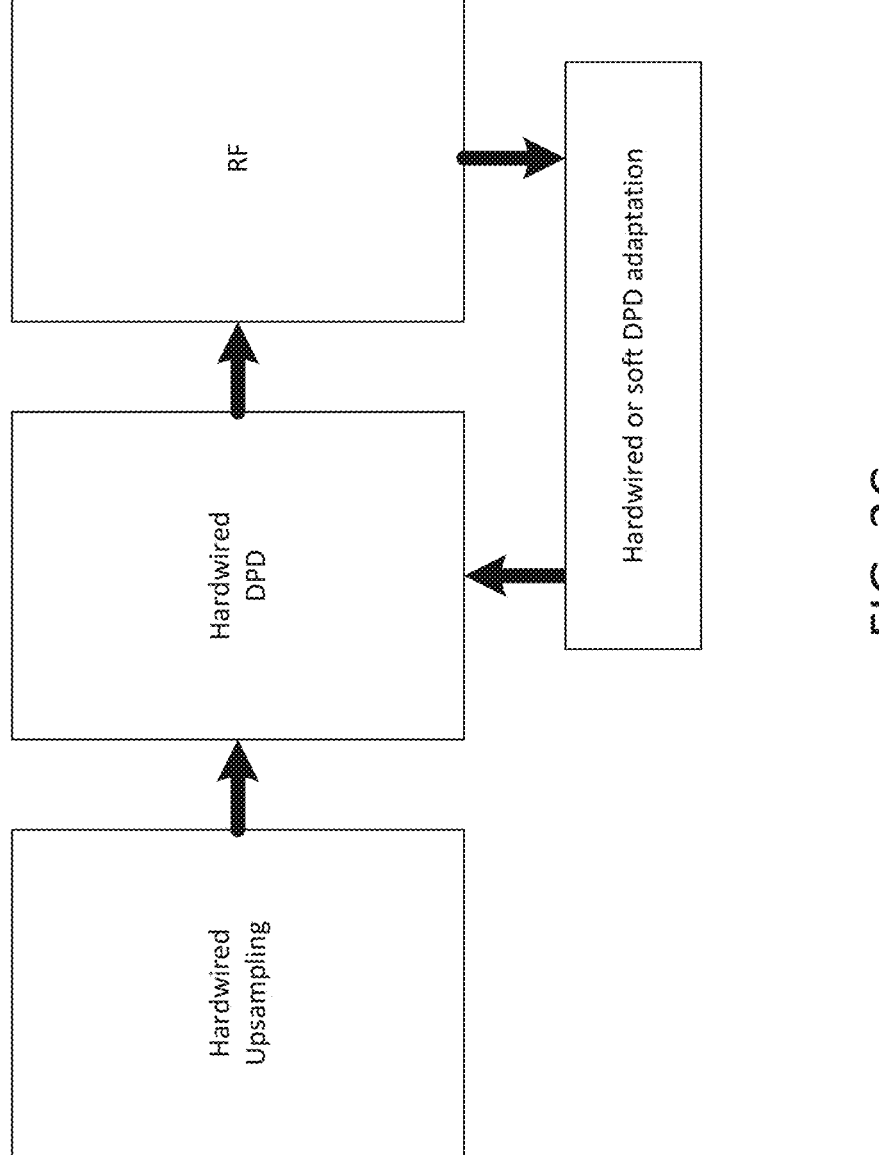
FIG. 3C illustrates a conventional hybrid hardware accelerator and programmable processing array architecture for performing digital front end (DFE) functions.

Furthermore, and as shown in FIG. 3C, hybrid solutions exist that implement a hardwired ASIC configured to perform DFE functions in optimized hardware. This may include the use of a DPD pipeline that consists of HW blocks that may perform functions such as up-sampling and applying the DPD terms to data samples to be transmitted. Additional hardwired or software-based components may then be utilized to compute the DPD parameters used for the application of the DPD terms, as well as the adaptation of the DPD parameters and/or terms over time. However, such products still fail to achieve a solution that optimizes the benefits of both the hardware and software components.

With these conventional solutions in mind, it is clear that there is a need to efficiently capture the feedback data for DPD coefficient adaptation. However, for the adaptation, conventional techniques that use sample selection provide another level of complexity. Thus, current solutions to perform DPD coefficient adaptation fail to maintain efficient data capturing hardware support across various computational techniques, and also fail to maximize the amount of data that can be considered for sample selection.

The disclosure as further described herein addresses these issues by implementing a hybrid architecture that combines the benefits of a programmable processing array and a hardwired solution. To do so, and with reference to FIG. 4, the disclosure is directed to a hybrid architecture 400, as well as the interfaces 410, 412, 414, 416, 418, 420, and 422, which represent the various interfaces between a data source, a capture memory circuitry 402, a hardwired DFE portion 404, an RF front end 406, and a programmable processing array 408 (which may alternatively be referred to herein simply as a processing array). These interfaces are further discussed below with respect to FIGS. 6A and 6B. This architecture enables high flexibility at a low cost. To further limit the costs, the processing array 408 may have processing power and memory that is reduced compared to conventional processing array implementations. The specific interface solutions described herein thus enable efficient processing on such a cost-effective processing array.

Figure 4:
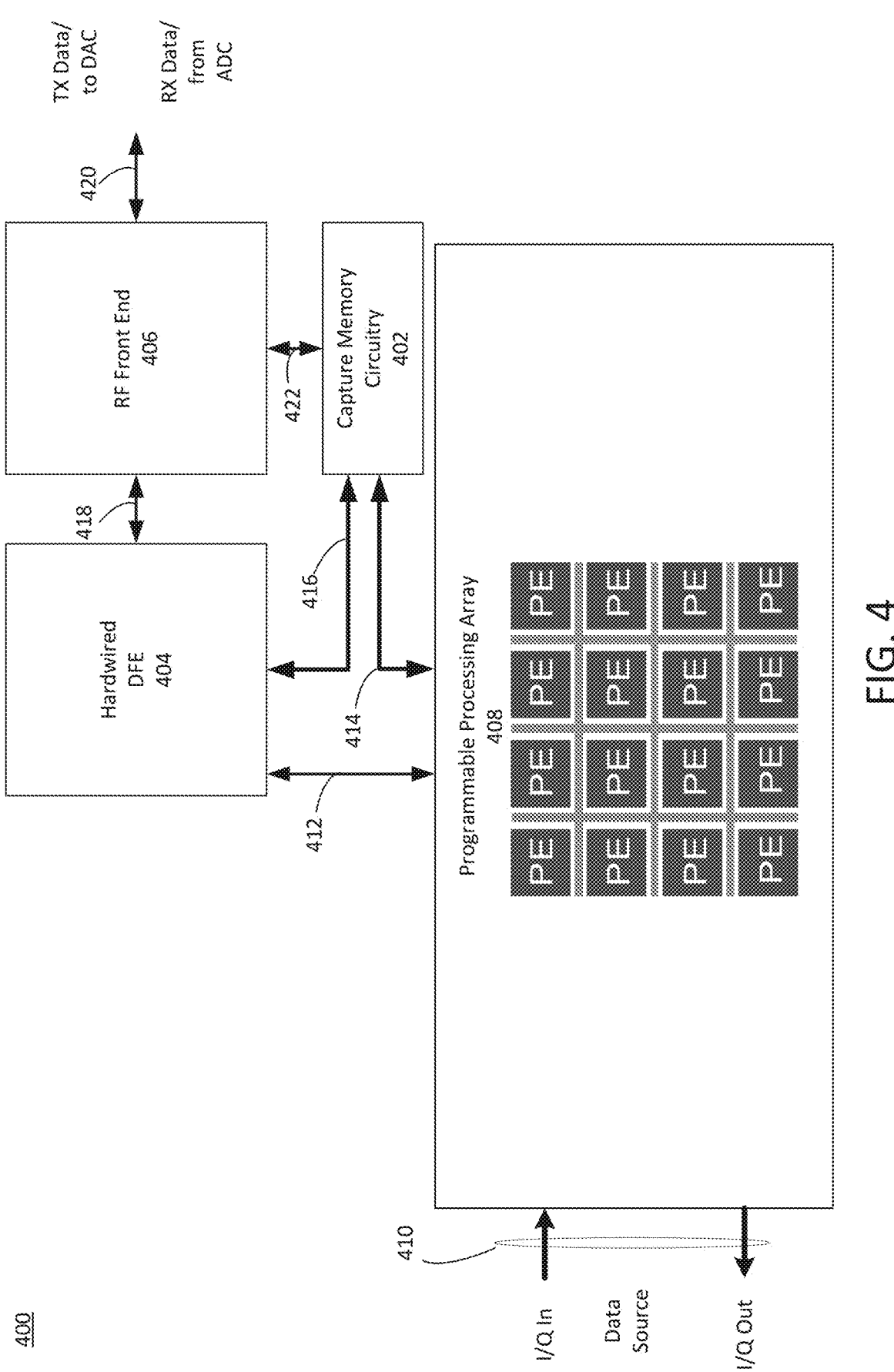
FIG. 4 illustrates a block diagram of a hybrid programmable processing array and hardware accelerator architecture, in accordance with the disclosure.

FIG. 4 illustrates a block diagram of a hybrid programmable processing array and hardware accelerator architecture, in accordance with the disclosure. The various components of the hybrid architecture 400 as shown in FIG. 4 may be implemented on a single chip, such as a system on a chip (SoC), or on separate chips or SoCs. The implementation of the hybrid architecture 400 as part of an SoC may be particularly advantageous for applications using high data rates, as doing so obviates the need to couple signals between different chips or via other external devices.

As further discussed herein, the hybrid architecture 400 implements a programmable processing array 408 configured to perform processing operations on received arrays of data samples (also referred to herein as data blocks), which may be executed in response to instructions that are transmitted to the individual PEs of the processing array 408. The hybrid architecture 400 is coupled to any suitable data source, which may comprise a data modem, to which the data interface 410 is coupled to facilitate the transmission and reception of digital data streams in accordance with any suitable data rate and/or communication protocol.

The hybrid architecture 400 also implements a hardwired DFE, and which may comprise one or more hardware accelerators as further discussed herein. Thus, the hardwired DFE 404 as shown in FIG. 4 may include hardware blocks dedicated to the execution of specific DFE functions. Thus, the hardwired DFE 404 may constitute any suitable umber of hardware accelerators identified with the hybrid architecture 400. The hardwired DFE 404 is coupled to the processing array 408 via the interface 412, and the interaction and data flow between these components is discussed in further detail below. Thus, the hybrid architecture 400 functions to implement the PEs of the processing array 408 to receive arrays of data samples, to perform processing operations on the received arrays of data samples in accordance with received instructions, and then generate an array of output data samples after such operations have been performed.

Moreover, the hardwired DFE 404 is configured to implement hardware blocks to receive either the arrays of output data samples provided by the PEs, which are converted to a data format recognized by the hardware accelerator. Additionally or alternatively, the hardwired DFE 404 is configured to receive data from another source such as the RF front end 406 via the interface 418 and/or via the capture memory circuitry 402 via the interface 416. The hardware blocks of the hardwired DFE 404 are thus configured to perform various hardware-based computations on those data samples, and to then generate output data samples after such hardware-based computations have been performed.

The processing operations performed by the PEs of the processing array 408 and the hardware-based computations performed by the hardware blocks of the hardwired DFE 404 may, in some scenarios, be various DFE functions. Such DFE functions may include, in various illustrative and non-limiting scenarios, digital signal processing operations that are associated with wireless data communications, the application and/or calculation of finite impulse response (FIR) filter contributions to a digital data stream, equalizer functions, the calculation of digital pre-distortion (DPD) parameters, coefficients, or terms, the application or calculation of Fast Fourier Transforms (FFTs) and/or digital Fourier Transforms (DFTs), matrix operations, mixer and/or frequency correction calculations, peak detection and/or cancellation calculations, signal measurements, average signal measurement calculations over time, digital signal processing of signals transmitted or received via individual antenna data streams for multiple-input-multiple-output (MIMO) antenna systems, the computation and/or application of crest factor reduction (CFR) parameters, etc. Furthermore, the arrays of data samples processed by the PEs of the processing array 408 and the hardware blocks of the hardwired DFE 404 as discussed herein may be obtained from an in-phase (I) quadrature-phase (Q) data stream, and may be processed prior to data transmission of wireless signals or after receiving wireless signals.

The RF front end 406 may thus comprise any suitable number and/or type of components configured to facilitate the transmission of the processed arrays of data samples provided by the hardwired DFE 404 and to provide arrays of received data samples to the hardwired DFE 404. The RF front end 406 may implement any suitable number and/or type of components to facilitate such functionality, which may be components ordinarily associated with transceiver, transmitter, and/or receiver designs. Thus, the RF front end 406 may comprise any suitable number of RF transmit and receive chains, each comprising any suitable umber of components such as up-samplers, down-samplers, mixers, local oscillators, filters, switching blocks, amplifiers, etc. The RF front end 406 may be coupled to one or more antennas via an interface 420, which is coupled to a transmit/receive (TX/RX) stage that operates in the analog domain, and thus may include one or more digital-to-analog converters (DACs), each respectively coupled to an antenna (not shown). The TX/RX stage may additionally or alternatively include one or more analog-to-digital converters (ADCs) each respectively coupled to an antenna (not shown), which may comprise the same antennas used for data transmission as part of a controlled switching network.

The capture memory circuitry 402 is coupled to the hardwired DFE 404 via an interface 416, and to the programmable processing array 408 via an interface 414. As will be further discussed below, the hardwired DFE 404 may comprise any suitable number of hardware accelerators, each being configured to selectively output different arrays of data samples (also referred to herein as sets of data samples, blocks, or vectors) with respect to channelized data transmissions.

In one instance, the hardwired DFE 404 provides arrays of data samples to the data capture circuitry 402, which are input to a DPD accelerator in the hardwired DFE 404 that uses the DPD parameters, which are also fed as input to the hardwired DFE 404. These data samples are then used by the DPD hardware accelerator to apply the DPD terms in accordance with a data transmission over a particular channel. The data samples identified with this data transmission, i.e. after the application of the DPD terms via the DPD hardware accelerator, are also routed through the hardwired DFE 404, to the RF front end 406, and to the antenna via the interfaces 418, 420. Thus, in one instance, the data samples provided to the data capture circuitry 402 comprise the data samples after the application of the DPD terms. However, in another instance, the hardwired DFE 404 provides to the capture memory circuitry 402 the arrays of data samples input to the DPD accelerator, which are then processed by the DPD accelerator in the hardwired DFE 404 using the DPD parameters output by the programmable processing array 408. In other words, in this scenario, the data samples provided to the data capture circuitry 402 comprise the data samples that are input to the DPD accelerator prior to the application of the DPD terms. In each case, and as further discussed herein, the data samples provided to the data capture circuitry 402 by the hardwired DFE 404 may be referred to as "output data samples," in the context that in each case these data samples are output by the hardwired DFE 404. Thus, the output data samples stored in the data capture circuitry 402 may represent data samples corresponding to different stages of data samples with respect to a data transmission, i.e. before or after the DPD terms have been applied by the DPD accelerator.

In each case, the data samples provided by the hardwired DFE 404 may be referred to herein as output data samples, and may be stored by the capture memory circuitry 402 correlated to a base station frame number (BFN) counter time. In this way, the hybrid architecture 400 allows for flexibility with respect to how the DPD parameters are adapted over time, as well as the correlation of the appropriate data transmission with the measured feedback data. The details of how the data is sampled and synchronized between the capture memory circuitry 402, the hardwired DFE 404, the RF front end 406, and the programmable processing array 408 are discussed in further detail below with respect to FIGS. 6A-6B.

The capture memory circuitry 402 is coupled to the RF front end 406 via an interface 422. Thus, and as further discussed below, the capture memory circuitry 402 may comprise one or more sectorized buffers configured to temporarily store arrays of data samples received via the RF front end 406, which may represent measured feedback data. That is, the feedback data samples stored in the capture memory circuitry 402 in this manner may correspond to a previous data transmission using DPD terms that have been applied via the hardwired DFE 404. Thus, the feedback data samples may be used to measure the actual output at the antenna (such as output via a coupled power amplifier) resulting from the application of the computed and applied DPD terms. These feedback data samples may then be provided back to the programmable processing array 408, as further discussed below, to dynamically compute adapted DPD parameters using the output data samples provided by the hardwired DFE 404, as noted above, and the feedback data samples. The DPD parameters may thus be dynamically adapted over time to influence subsequent data transmissions based upon the current operating conditions. Additional detail is provided further herein regarding the various data flows used to implement DPD adaptation.

As discussed in further detail below, the programmable processing array 408 (also referred to herein simply as a processing array) may be implemented as any suitable type of processing array architecture that includes an array of processing elements (PEs). The processing array 408 may implement any suitable number and/or type of PEs having any level of programmable functionality depending upon the particular application. In some scenarios, the processing array 408 may be implemented as a programmable vector processor having any suitable configuration and design as noted herein.

As noted above, a vector processor may include any suitable type of processor that implements an instruction set using instructions designed to operate efficiently and effectively on large one-dimensional arrays of data samples, which may alternatively be referred to as vectors or data vectors. The processing array 408 may, when implemented as a vector processor, implement as the PEs any suitable number of execution units, which may also be referred to as cores, and which may be configured in any suitable manner as further discussed herein. In other scenarios, the processing array 408 may alternatively be implemented with any suitable number of alternate PEs. In accordance with such alternative scenarios, the processing array 408 may include, as the PEs, digital signal processor (DSP) blocks and/or PEs identified with an FPGA, individual DSP processing blocks of a larger DSP, etc.

In any event, the processing array 408 may receive, transmit, and/or perform processing operations on arrays of data samples, which may alternatively be referred to herein as blocks, sets of data samples, or data vectors regardless of the particular implementation of the processing array 408. Each array may thus represent any suitable number of data samples. The processing array 408 thus provides flexibility in the computations performed, as the processing array 408 may access instruction sets or otherwise be programmed to perform processing operations, the specific type being a function of the particular implementation of the processing array 408 and the instructions that are executed at a particular time. That is, scenarios include the PEs of the processing array 408 performing processing operations on the arrays of data samples as discussed herein to provide data bit manipulation, formatting, truncation, mathematical computations, etc.

Depending upon the current instructions provided to the individual PEs of the processing array 408, the PEs may or may not modify the values of the arrays of data samples. In some scenarios, the PEs may receive an array of data samples as input, which are then output and transferred to a respective hardware accelerator of the hardwired DFE 404, or another PE, without modifying their values as a result of the execution of the processing operations. This may include the use of processing operations that may reorder, reformat, or reorganize the arrays of data samples. In other scenarios, the processing operations may include modifying an array of data samples received as input, which are then output and provided to respective hardware accelerator of the hardwired DFE 404 (or another PE). Thus, each PE of the processing array 408 may perform processing operations on an array of received data samples to provide an array of processed data samples. Again, these processing operations may represent any suitable type of processing task such that the processed data samples may represent a modification, bit manipulation, formatting, truncation, mathematical computations, etc. on the array of received data samples.

Again, the hardwired DFE 404 may perform DFE functions that include the application of computed DPD coefficients or terms to an array of data samples output via the programmable processing array 408. The DPD coefficients or terms may thus be modified over time in accordance with the modified DPD parameters computed via the programmable processing array 408 to dynamically adapt to operating conditions, to account for various non-idealities of the power amplifier (PA), and/or to account for non-idealities of other components of the transmit chain used for data transmission. Thus, the hardwired DFE 404 may receive the DPD parameters that have been computed by the programmable processing array 408, which are then used to evaluate and/or apply, as part of the application of the DPD terms, the appropriate DPD function to data samples to be transmitted.

DPD Computations

As the computation and adaptation of DPD parameters (as well as the application of DPD coefficients or terms using such parameters) is discussed extensively throughout the remainder of this disclosure, it is prudent to now provide additional detail regarding such computations. The hardware accelerators identified with the hardwired DFE 404 may comprise dedicated HW blocks configured to apply DPD coefficients or terms by referencing a set of common lookup table (LUT) based memory entries, which may be used in accordance with any suitable number and/or type of DPD algorithm implementations. As further discussed below, the hardware accelerators are configured efficiently by having limited flexibility to select the number and type of terms up to a maximum number, which is 48 terms in the following illustrative scenario. Thus, and as further described below, the hardware accelerators may implement sets of LUTs that store entries identified with the terms of the particular function that is to be evaluated to output the hard-computed terms. These LUT entries may be computed by the programmable processing array 408 as part of the DPD parameter adaptation computations discussed herein. Thus, such LUTs as described herein may have any suitable size and be identified with any suitable type of memory structure. The entries of the LUTs may thus represent evaluated values of a corresponding function, which may be represented in accordance with the terms of a function as denoted in the Equations 1 and 2 below. The entries of the LUTs used in this manner, i.e. the LUT based memory terms, are then multiplied by a set of data samples or any suitable function (such as a polynomial function). This process may then be repeated for any suitable number of delayed signal versions of an input signal, with the results being summed together as indicated in Equation 2 below to apply the computed terms to a particular set of data samples to be transmitted.

The DPD function may represent any suitable function that relates signal samples in the RF chain to provide DPD coefficients as a function of those samples. For typical DFE applications, the DPD function represents a non-linear function of a complex signal represented as x. The DPD function typically depends on the history of the signal that is needed to model the memory effects of the power amplifier identified with the RF chain. To provide further clarity, let x-a denote a complex value at a measured sample d from the past. A common model from literature is a polynomial function written in the form of Eqn. 1 below as follows:

$$\sum_{p}\sum_{d_1}\sum_{d_2}\cdots\sum_{d_p}\theta_{d_1,d_2,\ldots,d_p}x_{-d_1}x_{-d_2}\cdots x_{-d_p} \qquad \text{Eqn. 1}$$

where the signal values from different parts of the history defined by $d_1, \ldots, d_p$ are combined together and multiplied by a corresponding parameter $\theta_{d_1, \ldots, d_p}$ The delays $d1, \ldots, d_p$ and the corresponding parameters are typically determined for each power amplifier in the RF chain implementing the DFE via an optimization process. This optimization process may be performed by the programmable processing array 408 such that the hardware accelerators identified with the hardwired DFE 404 compute the coefficients to be applied to data samples to be transmitted using the supplied DPD parameters. The variable p represents an order of the polynomial function, and determines the number of various delays d1 . . . dp and terms x-d1.

Another common DPD function implementation is to use lookup table (LUT) entries based on the signal magnitude to model the non-linearity, and then model additional non-linearities using polynomial terms. Thus, if there are to be a maximum of K different terms, with K in the illustrative scenario used in Eqn. 2 below and referenced throughout the disclosure being 48, although the disclosure is not limited to this particular number of terms. A choice of terms common in the literature may be expressed in accordance with Eqn. 2 below as follows:

$$\sum_{d_1,d_2,d_3}^{48} LUT_{d_1,d_2,d_3}\left(|x_{-d_1}|\right)[x_{-d_2} \text{ or } x_{-d_2}^*][x_{-d_3}^2 \text{ or } |x|_{-d_3}^2 \text{ or } 1][sc \text{ or } 1] \qquad \text{Eqn. 2}$$

where there are 48 different combinations of the delays d1, d2, d3 and corresponding LUTs for additional polynomial multiplier terms.

The above-referenced Equations are provided for clarity and in a non-limiting sense. Indeed, a large variety of approaches exist to model power amplifiers for the calculation of DPD coefficients. However, the most common approach is to sum the various non-linear terms as explained above. Other approaches to model long term effects involve averaging the signal from the past. Such terms may have the same form as above, although the signal x is replaced by a long term running average of the signal. It is noted that the term "term" as used herein may refer to the computed components of any suitable type of function, such as a non-linear function, which has a corresponding coefficient. Thus, the term(s) may represent any parameters of the corresponding function (such as a non-linear function), although typical applications include the term being synonymous with a single multiplicative coefficient, making the final solution easier to compute. Thus, in such a case the DPD terms may be synonymous with the DPD coefficients, with the DPD parameters being computed by the programmable processing array 408 and utilized by the dedicated HW blocks of the hardware accelerator 404 to apply computed DPD terms to a particular set of data samples to be transmitted.

Programmable Processing Array Architecture

Figure 5:
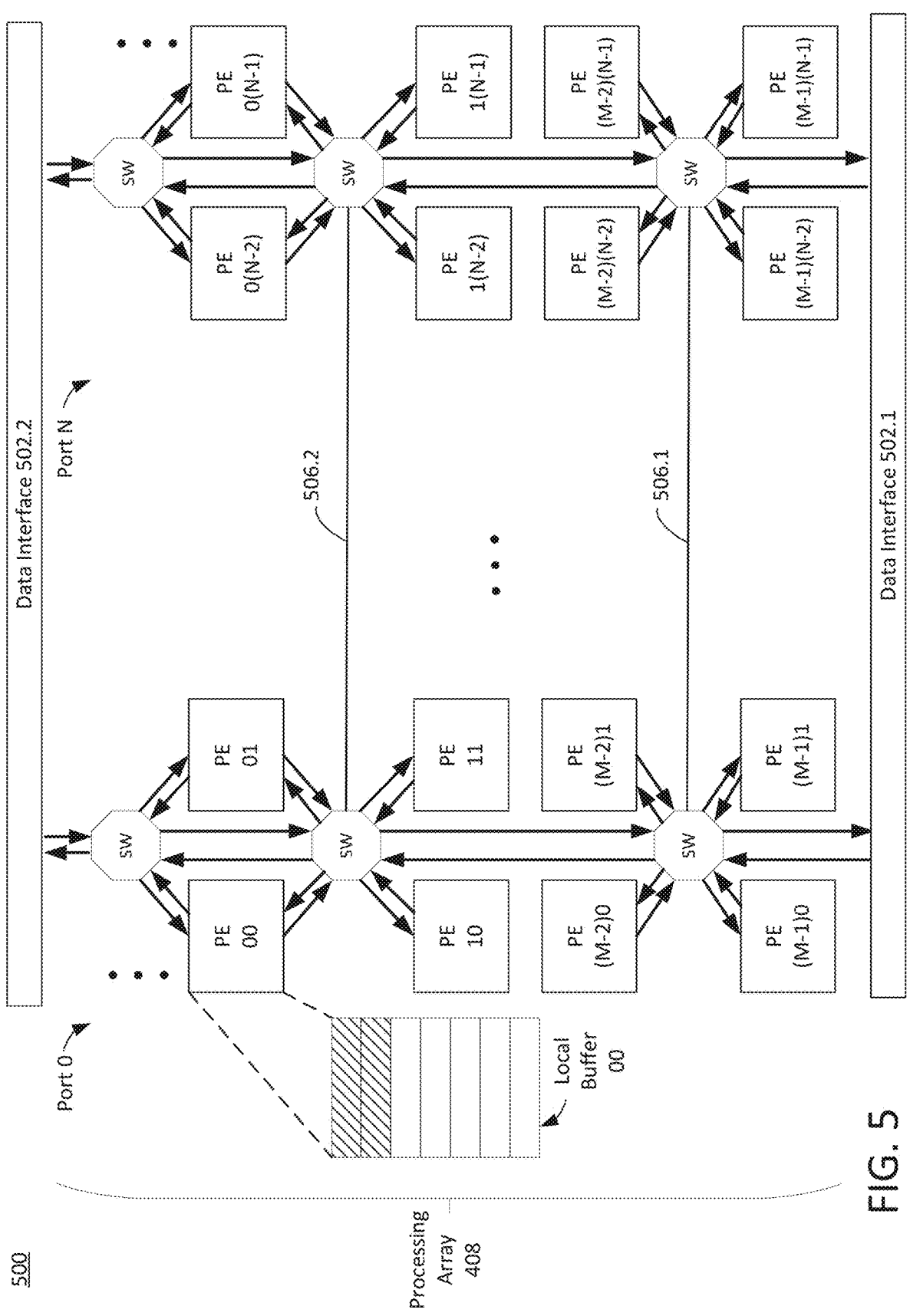
FIG. 5 illustrates a block diagram showing details of a portion of a programmable processing array identified with a hybrid architecture, in accordance with the disclosure.

FIG. 5 illustrates a block diagram showing details of a portion of a programmable processing array identified with a hybrid architecture, in accordance with the disclosure. The programmable processing array portion 500 as shown in FIG. 5 further illustrates details of the programmable processing array 408 as shown in FIG. 4. Thus, the processing array 408 may include any suitable number N of ports, with each port including any suitable number M of processing elements (PEs). Although each port is shown in FIG. 5 as including 8 PEs, this is for case of explanation and brevity, and the processing array 408 may include any suitable number of such PEs per port. Thus, the processing array 408 may include a mesh of PEs, the number of which being equal to the number of PEs per port (M) multiplied by the total number of ports (N). Thus, for an illustrative scenario in which the processing array 408 includes 8 ports and 8 PEs per port, the processing array 408 would implement (M×N)= (8×8)=64 PEs. Moreover, in accordance with such a configuration, each port may be identified with a respective channel and antenna that is used as part of a multiple-input multiple-output (MIMO) communication system. Thus, the number of channels and antennas used in accordance with such systems may be equal to the number N of ports, with each port being dedicated to a data stream transmitted and received per antenna.

Each of the PEs in each port of the processing array 408 may be coupled to the data interfaces 502.1, 502.2, and each PE may perform processing operations on an array of data samples retrieved via the data interfaces 502.1, 502.2 as discussed herein. The access to the array of data samples included in the PEs may be facilitated by any suitable configuration of switches (SW), as denoted in FIG. 5 via the SW blocks. The switches within each of the ports of the processing array may also be coupled to one another via interconnections 506.1, 506.2, with two being shown in FIG. 5 for the illustrative scenario of each port including 8 PEs. Thus, the interconnections 506.1, 506.2, function to arbitrate the operation and corresponding data flow of each grouping of 4 PEs within each port that are respectively coupled to each local port switch. The flow of data to a particular grouping of PEs and a selection of a particular port may be performed in accordance with any suitable techniques, including known techniques. In one illustrative scenario, this may be controlled by referencing the global system clock or other suitable clock via an SoC, network, system, etc., of which the processing array 408 forms a part.

Thus, at any particular time, one or more of the PEs may be provided with and/or access an array of data samples provided on one of the data buses to perform processing operations, with the results then being provided (i.e. transmitted) onto another respective data bus. In other words, any suitable number and combination of the PEs per port may sequentially or concurrently perform processing operations to provide an array of processed data samples to another PE or to the data interfaces 502.1, 502.2 via any suitable data number and/or type of interconnections, which may constitute a set of wires, buses, etc. The decisions regarding which PEs perform the processing operations may be controlled via operation of the switches, which may include the use of control signals in accordance with any suitable techniques to do so, including known techniques.

However, and as further discussed below, the data interfaces 502.1, 502.2 function as "fabric interfaces" to couple the processing array 408 to other components of the hybrid architecture 400. To provide an illustrative scenario which is further described in detail below with reference to FIGS. 6A-6B, the data interfaces 502.1, 502.2 may represent any of the data interfaces 410, 412, and/or 414 as discussed above with reference to FIG. 4. Thus, the data interfaces 502.1, 502.2 are configured to facilitate the exchange of data between the PEs of the processing array 408, the capture memory circuitry 402, the hardware accelerators of the hardwired DFE 404, the RF front end 406, and/or the data source. The data interfaces 502.1, 502.2 may thus to be configured to provide data that is to be transmitted via the hybrid architecture 400. The data interfaces 502.1, 502.2 are configured to convert data samples from a data stream to arrays of data samples upon which the processing operations are then performed via the PEs of the processing array 408. The data interfaces 502.1, 502.2 are also configured to convert the arrays of data samples back to a block or stream of data samples, as the case may be, which are then provided to the hardware accelerators of the hardwired DFE 404, the RF front end 406, and/or the data source, etc.

The data interfaces 502.1, 502.2 may represent any suitable number and/or type of data interface that is configured to transfer data samples between the various components of the hybrid architecture 400. Thus, the data interfaces 502.1, 502.2 may be implemented as any suitable type of data interface for this purpose, such as a standardized serial interface used by data converters (ADCs and DACs) and logic devices (FPGAs or ASICs), and which may include a JESD-based standard interface and/or a chip-to-chip (C2C) interface. The data samples provided by the data source as shown in FIG. 4 may be in a data array format or provided as streaming (i.e. serial) data bit streams. In the latter case, the data interfaces 502.1, 502.2 may implement any suitable type and/or number of hardware and/or software components, digital logic, etc., to manage the translation of the streams of data bit samples to an array of data samples of a size and format that is recognized and implemented via the processing array 408, and vice-versa (i.e. when data is provided from the processing array 408 to another component of the hybrid architecture 400).

The data interfaces 502.1, 502.2 may thus represent different types of data interfaces depending upon the specific implementation of the processing array 408 within the hybrid architecture 400 and the stage within the hybrid architectures 400 in which the data interfaces are implemented. That is, the data interfaces 502.1, 502.2 may be implemented as different components based upon the source of data samples received by the processing array 408, as well as the destination of processed arrays of data samples transmitted by the processing array 408. In one scenario in which the hybrid architecture 400 is implemented as part of a wireless communication device, each of the PEs in the processing array 408 may be coupled to the data interfaces 502.1, 502.2 via any suitable number and/or type of data interconnections, which may include wired buses, ports, etc. The data interfaces 502.1, 502.2 may thus be implemented as a collection of data buses that couple each port (which may represent an individual channel or grouping of individual PEs in the processing array 404) to a data source via a dedicated data bus. As shown in further detail in FIG. 6A, in accordance with such scenarios each data bus may be adapted for use in a DFE used for wireless communications, and thus the dedicated buses may include a TX and an RX data bus per port in this non-limiting scenario.

Hybrid Architecture Synchronization

Figure 6A:
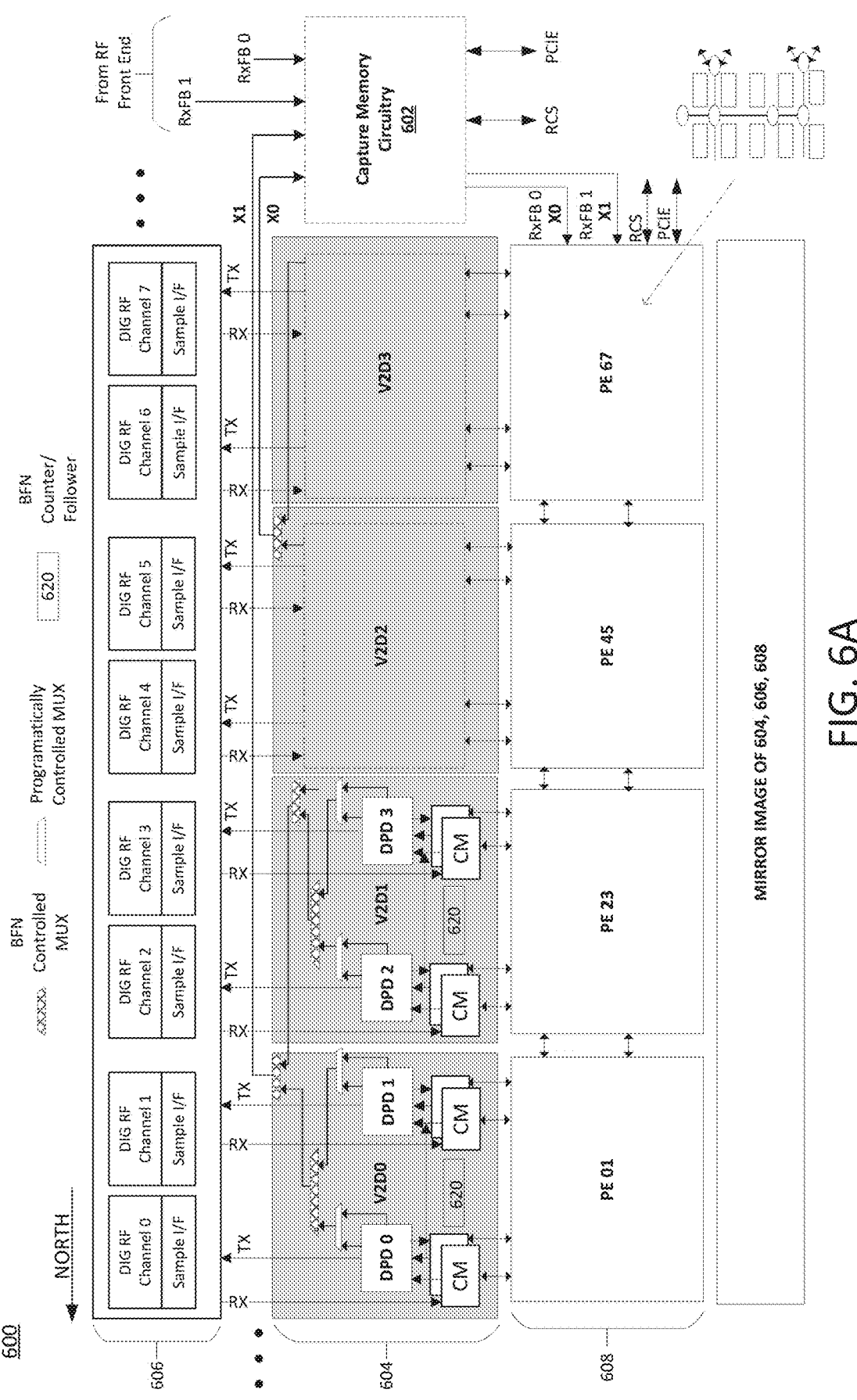
FIG. 6A illustrates a block diagram showing additional details of a first portion of a hybrid programmable processing array and hardware accelerator architecture, in accordance with the disclosure.
Figure 6B:
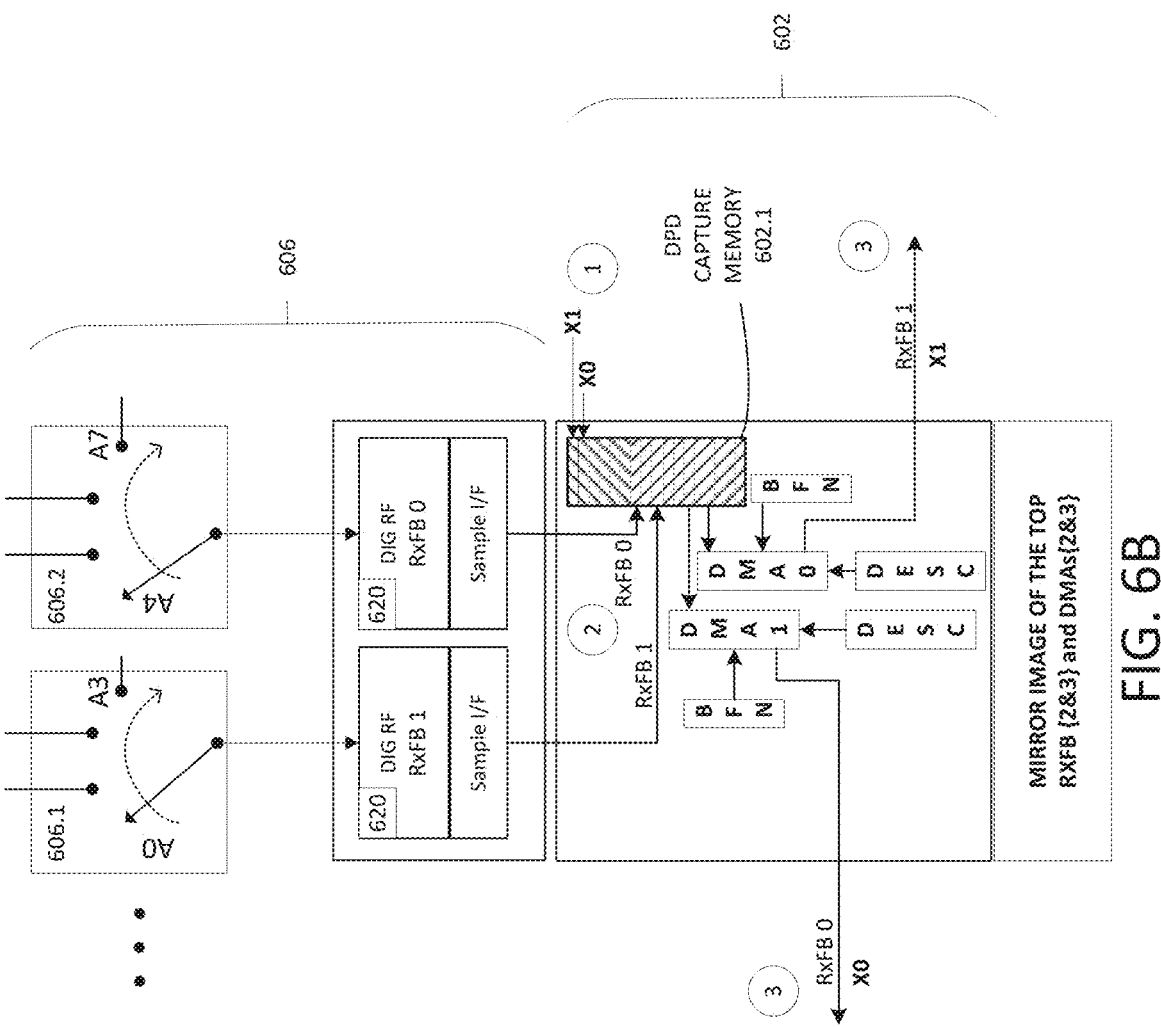
FIG. 6B illustrates a block diagram showing additional details of a second portion of a hybrid programmable processing array and hardware accelerator architecture, in accordance with the disclosure.

FIG. 6A illustrates a block diagram showing additional details of a first portion of a hybrid programmable processing array and hardware accelerator architecture, in accordance with the disclosure. The hybrid architecture 600 as shown in FIG. 6A may be identified with the hybrid architecture 400 as shown and discussed herein with reference to FIG. 4. Thus, the capture memory circuitry 602, the hardwired DFE 604, the RF front end 606, and the programmable processing array 608 as shown in FIG. 6A may be identified with the capture memory circuitry 402, the hardwired DFE 404, the RF front end 406, and the programmable processing array 408, respectively, as shown in FIG. 4. Moreover, the arrows as shown in FIG. 6A connecting the capture memory circuitry 602, the hardwired DFE 604, the RF front end 606, and the programmable processing array 608 with one another as shown in FIGS. 6A-6B may be identified with the various data interfaces 412, 414, 416, 418, and 422 as shown in FIG. 4.

The hybrid architecture 600 as shown in FIG. 6A may receive data samples to be transmitted via any suitable data source, which again may be a modem as discussed herein, and which may provide a digital data stream of IQ data samples (IQ In). This data source is not shown in FIG. 6A for purposes of brevity, but may provide data samples to the programmable processing array 608 as noted above. The hybrid architecture 600 is configured to facilitate the sequential transmission and reception of data via the RF front end 606. The data flow with respect to the transmission of data is provided in further detail throughout this disclosure for clarity and case of explanation and to demonstrate the use of the adapted DPD parameters, although it will be understood that the hybrid architecture 600 may facilitate both the transmission and reception of data.

Thus, the programmable processing array 608 is configured to perform processing operations on arrays of data samples that are to be transmitted to compute the DPD parameters in accordance with a particular data transmission. The programmable processing array 608 is configured to transmit the computed DPD parameters and the block of data samples identified with the computed DPD parameters to the hardwired DFE 604. To do so, the hardwired DFE 604 is organized into a set of any suitable number of hardwired portions, which may alternatively be referred to herein as HW blocks, with four being shown in FIG. 6A as V2D0, V2D1, V2D2, and V2D3. Each of the hardwired portions comprises a multiplexer network, one or more hardware accelerator DPD 0, DPD 1, etc., and one or more common modules (CM). The hardwired DFE 604 is thus configured such that each hardwired portion V2D is identified with any suitable number of channels implemented via the RF front end 606.

Each hardwired portion of the hardwired DFE 604 may comprise any suitable number of common modules (CMs) that are configured to enable the transfer of data samples between the hardwired DFE 604 and the programmable processing array 608 in both directions. Thus, the CMs as shown in FIG. 6A may be identified with or otherwise form part of the interface 412 as shown in FIG. 4, or one of the data interfaces 502.1, 502.2 as shown in FIG. 5. In any event, the common modules may be implemented as any suitable number and/or type of logic, hardware blocks, etc., that facilitate the formatting of and/or transfer of data between the hardwired DFE 604 and the programmable processing array 608.

Using the scenario as shown in FIG. 6A as a non-limiting and illustrative scenario, the hardwired portion V2D0 corresponds to the channels 0 and 1, the hardwired portion V2D1 corresponds to the channels 2 and 3, etc. Again, each of these channels may be identified with an antenna used for data transmissions (not shown). Thus, the hardware accelerators DPD 0, DPD 1, etc. identified with each hardwired portion V2D may also be channelized such that the arrays of data with the applied DPD terms are coupled to each respective channel, as denoted in FIG. 6A via the arrows referenced with the "TX" notation. Likewise, each hardwired portion V2D0, V2D1, etc., may couple received data samples to the programmable processing array 608, as denoted in FIG. 6A via the arrows referenced with the "RX" notation. Additional details regarding the operation and data flow of the hardwired portions of the hardwired DFE 604 are further discussed below.

The programmable processing array 608 may be organized into any suitable number of ports, as noted above with reference to FIG. 5, with each port being identified with a specific channel in the RF front end 606. These ports are shown in FIG. 6A and referred to herein as parts of the PE blocks, and are denoted in accordance with the channel groupings in the same manner as the DFE hardwired portions noted above. Thus, each of the PE blocks PE 01, PE 23, PE 45, PE 67, etc. is coupled to a corresponding hardwired portion V2D0, V2D1, V2D2, V2D3, etc., that corresponds to the same channel grouping. Thus, each PE block as shown in FIG. 6A may be identified with any suitable number of processing elements and switches, as discussed with reference to FIG. 5. The different PE blocks may transfer data to one another in accordance with the received processing instructions, such that the various processing elements may transfer data among the various PE blocks, as illustrated in FIG. 6A via the horizontally-coupled arrows between each of the PE blocks. These arrows may represent data interfaces and/or buses that constitute part of the fabric of the programmable processing array 608, as noted above.

It is noted that the hybrid architecture 600 as shown in FIG. 6A and discussed herein may be implemented as part of any suitable type of wireless communication platform and thus utilize any suitable number of channels and corresponding antennas. In the non-limiting and illustrative scenario as shown in FIG. 6A, it is assumed that a total of 16 different antennas and corresponding RF channels are supported. Thus, the RF front end 606, the hardwired DFE 604, and the programmable processing array 608 are each organized in the manner as shown to accommodate 8 channels (i.e. ports) and corresponding antennas (not shown). Although not shown in FIG. 6A in further detail for purposes of brevity, each of the RF front end 606, the hardwired DFE 604, and the programmable processing array 608 may comprise half of a respective portion thereof. In other words, the hybrid architecture 600 may comprise an additional RF front end, hardwired DFE, and programmable processing array that form a mirror image with respect to those shown such that the hybrid architecture 600 may support a system including 16 antennas and channels.

Therefore, the programmable processing array 608 may comprise four additional PE blocks PE 89, PE 1011, PE 1213, and PE 1415, which are coupled to one another in the same manner as the PE blocks PE 01, PE 23, PE 45, and PE 67 as shown in FIG. 6A. These additional PE blocks PE 89, PE 1011, PE 1213, and PE 1415 are in turn coupled to a further hardwired DFE (not shown) in the same manner as the couplings between the hardwired DFE 604 and the programmable processing array 608 as shown in FIG. 6A. The hardwired portions of the additional hardwired DFE may be configured identically with respect to the mirror image (symmetrically) of the hardwired portions V2D0, V2D1, V2D2, V2D3, etc. as shown in FIG. 6A, which are each coupled to the additional PE blocks PE 89, PE 1011, PE 1213, and PE 1415 in a similar manner. The capture memory circuitry 602 may also comprise half of such a design as shown, with the additional capture memory circuitry being coupled to the additional PE blocks PE 89, PE 1011, PE 1213, and PE 1415, and the additional hardwired portions of the additional hardwired DFE in a similar manner as those shown in FIG. 6A. Thus, the hybrid architecture 600 may be scaled to accommodate any suitable number of channels and antennas. For ease of explanation, the functionality of the hybrid architecture 600 is explained primarily with reference to the components illustrated in FIGS. 6A-6B.

As further discussed herein, the hybrid architecture 600 may reference or otherwise correlate each array of data samples referenced to a global system counter, which may be implemented as a base station frame number (BFN) counter time in one non-limiting and illustrative scenario. Therefore, although the disclosure uses the BEN counter time in further explanations as provided below, this is a non-limiting scenario and any suitable type of global system counter may be implemented in addition to or instead of the BEN counter time. Thus, the hybrid architecture 600 may utilize this global system counter to ensure that the correct arrays of data samples are synchronized when processed with respect to previous data transmissions and channels. In other words, by referencing the movement of the arrays of data samples in this manner with a global system counter, the hybrid architecture 600 ensures that DPD parameters are adapted by the programmable processing array 608 corresponding to the correct previous data transmission via one of the channels as shown in FIG. 6A, and that these adapted DPD parameters are used to compute and apply the DPD terms to the subsequent data transmissions in accordance with the same channel.

To do so, each of the hardwired portions V2D0, V2D1, V2D2, V2D3, etc., comprises a BEN counter 620 or a BEN follower 620, which may collectively be referred to herein as a BEN counter/follower 620. The time in the BEN counter/follower 620 may be continuously incremented, and the BEN counter/follower 620 may be programmed with a BEN event time count regarding when to generate an output event. Thus, when BFN counter/follower 620 internally-incremented time matches a programmed BFN event time count, an event pulse is generated, which is then used to switch the various multiplexers accordingly, as discussed herein. Alternatively each of the hardwired portions V2D0, V2D1, V2D2, V2D3 has access to the BEN counter/follower 620 (via one or more buses, wires, etc.) that may be implemented elsewhere within the SoC or external to the SoC.

In any event, each block (i.e. array) of data transferred within the hybrid architecture 600 may be identified with a predetermined number of clock cycles to which the BFN counter/follower 620 is referenced. Thus, the BEN counter/follower 620 may regularly generate clock signals in accordance with each clock cycle based upon a global synchronization scheme that implemented by the hybrid architecture 600. The BFN counter/follower 620 may indicate, in one illustrative and non-limiting scenario, a radio frame number that is regularly and periodically incremented in accordance with a predetermined time period (such as every 10 milliseconds, every 1 millisecond, etc.) based upon the particular communication protocol that is implemented, and which may be used for network synchronization of a radio base station (RBS) or other suitable wireless communication component in which the hybrid architecture 600 is implemented.

Turning back to the hardwired DFE 604 as shown in FIG. 6A, each of the hardwired portions V2D0, V2D1, V2D2, V2D3, etc., comprises a set of hardware accelerators DPD 0, DPD 1, DPD 2, DPD 3, etc., which are configured to compute the DPD terms using the DPD parameters received via the programmable processing array 608, which again are applied to an array of data samples to be transmitted via a respective channel. Thus, each hardware accelerator "DPD" is configured to output both the array of data samples prior to the application of the DPD terms as well as the after the applied DPD terms that are computed using the DPD parameters, as noted herein. Thus, one of the two arrows output via each hardware accelerator DPD 0, DPD 1, DPD 2, DPD 3, etc., corresponds to the array of data samples prior to the application of the DPD terms, whereas the other of the two arrows output via each hardware accelerator DPD 0, DPD 1, DPD 2, DPD 3, etc., corresponds to the array of data samples after the application of the DPD terms, i.e. the data samples to be transmitted.

Moreover, and with continued reference to FIG. 6A, each of the hardwired portions V2D0, V2D1, V2D2, V2D3, etc., also comprises a network of multiplexers, which may be controlled in different ways. The first tier of multiplexers within the network, which are solid colored and directly coupled to the hardware accelerators DPD 0, DPD 1, DPD 2, DPD 3, etc., are programmatically controlled such that each multiplexer selectively outputs one of the sets of data samples provided by each respectively-coupled hardware accelerator DPD in accordance with a control signal. This control signal may be provided via a processor that is part of the SoC, network, system, etc., of which the hybrid architecture 600 forms a part. Thus, an overall system-wide decision may control the first tier of multiplexers such that the data (X0, X1) provided to the capture memory circuitry 602 represents either the data samples prior to the application of the DPD terms or after the application of the DPD terms that are computed using the DPD parameters, as noted herein.

The second tier of multiplexers within the network are directly coupled to the output of the first tier of multiplexers, are colored with a hatching pattern, and are BFN controlled. Thus, and referring to the first hardwired portion V2D0, the second tier of multiplexers are configured to selectively output the sets of data samples provided by the hardware accelerator DPD 0 or DPD 1, which again may represent either the input prior to the application of the DPD terms or after the application of the DPD terms that are computed using the DPD parameters by each respective hardware accelerator. The second tier of multiplexers identified with each of the hardwired portions V2D0, V2D1, V2D2, V2D3, etc. are likewise configured in a BFN-controlled manner, i.e. these multiplexers utilize control signals to selectively output data samples, but for the BFN-controlled multiplexers these control signals are provided in accordance with the BEN frame number for a particular data transmission.

The third tier of multiplexers are directly coupled to the output of the second tier of multiplexers, are colored with a hatching pattern, and are also BFN controlled. Thus, and referring to the first and the second hardwired portions V2D0, V2D1, the third tier of multiplexers are configured to selectively output the sets of data samples provided by one of the hardware accelerators DPD 0, DPD 1, DPD 2, or DPD 3. Thus, the use of BEN control for the second and third tier of multiplexers in this way enables the hybrid architecture 600 to output the data samples X1 that are time-aligned (i.e. synchronized) in accordance with a specific data transmission time (such as a radio frame number) and channel, in this case one of the channels 0, 1, 2, or 3. Moreover, the use of programmatic control for the first tier of multiplexers enables the hybrid architecture 600 to output, as the output data samples X1, either the data samples prior to the application of the DPD terms or after the application of the DPD terms via any of the hardware accelerators DPD 0, DPD 1, DPD 2, or DPD 3.

It is noted that each of the hardwired portions V2D0, V2D1, V2D2, and V2D3 may be configured (i.e. instantiated in hardware) in an identical manner as one another, and thus additional detail has been omitted for the hardwired portions V2D2 and V2D3 for case of explanation. Thus, the hardwired portions V2D1 and V2D3 include a third tier of multiplexers that have an input that is coupled to a constant logical value (such as zero volts, logical 0, etc., shown as a disconnected input in FIG. 6A) to pass the output from the coupled second tier multiplexers as shown, which is then provided at the output of each hardwired portion. This ensures that each respective third tier of multiplexer outputs the data samples from the respectively coupled second tier multiplexer as shown in FIG. 6A. This allows the different hardwired portions V2D0, V2D1, V2D2, and V2D3 to be instantiated in the same way, accounting for the differences in the physical layout of each of the hardwired portions V2D0, V2D1, V2D2, and V2D3.

Thus, the output data samples X0 may represent an output of either the data samples prior to the application of the DPD terms or after the application of the DPD terms, which again are computed using the DPD parameters via any of the hardware accelerators DPD 4, DPD 5, DPD 6, or DPD 7 (not shown). It is noted that the hybrid architecture 600 includes any suitable number and/or configuration of multiplexers in this manner to control the output of the data samples X0, X1, etc., to the capture memory circuitry 602, which may be increased or decreased as a function of the number of channels supported. With this in mind, the operation of the capture memory circuitry 602 is now provided.

The hybrid architecture 600 further includes a capture memory circuitry 602 as shown in FIG. 6A, which is shown in further detail in FIG. 6B. The capture memory circuitry 602 is coupled to the RF front end 606, which may include any suitable number of feedback channels, with two being shown in FIG. 6B as RxFB 0 and RxFB 1. Again, although not shown in FIGS. 6A and 6B in further detail for purposes of brevity, the RF front end 606 and the capture memory circuitry 602 may comprise half of a respective portion thereof. In other words, the hybrid architecture 600 may comprise an additional RF front end 606 that includes additional feedback channels 2 and 3, as well as a similar or identical architecture as shown in FIG. 6B for an additional portion of the capture memory circuitry 602 that is coupled in the same manner to the additional portion of the RF front end 606. In this way, and as noted in FIG. 6B, these additional portions of the RF front end 606 and the capture memory circuitry 602 form a mirror image with respect to those shown.

In any event, each of the feedback channels may be respectively coupled to an antenna switching block 606.1-606.N, with the two as shown in FIG. 6B being coupled to four antennas each. Thus, each switch position A0-A7 represents a coupling to one of eight respective antennas (not shown). Thus, the switch positions A0-A7 represent positions in which received data is obtained via a feedback measurement, which correspond to the non-limiting and illustrative scenario as shown in FIG. 6A for the eight channels as shown (which again may represent half of the total number of 16 antennas). In other words, the TX data samples identified with a data transmission, i.e. the data samples that have had the DPD terms applied via the different hardwired portions V2D0, V2D1, V2D2, and V2D3, are received as feedback data samples after ADC conversion (not shown) and formatting via the sample I/F coupled to each feedback channel of the RF front end 606, as shown in FIG. 6B.

These feedback data samples may be measured from any suitable location within the RF transmit chain, such as the output of a power amplifier used in accordance with the data transmission for a particular antenna and channel. Thus, the feedback data samples may constitute "observed" data samples such that the properties of the transmit chain (such as non-idealities) may be identified. This enables a comparison of the previously transmitted data samples from a point earlier in the transmit chain with the same data samples at a point later in the transmit chain.

As shown in FIG. 6B, the feedback data samples RxFB 0 and RxFB 1 output by the feedback channels of the RF front end 606 are stored in a buffer 602.1, which may alternatively be referred to herein as a capture memory or a DPD capture memory 602.1. As is the case for each of the channels as shown in FIG. 6A, the sample interfaces are configured to format the feedback data samples into arrays of data samples RxFB 0 and RxFB 1 having a size and format that are recognized by the PEs of the programmable processing array 608. Again, the blocks of data samples may be any suitable format and size based upon the implementation of the hybrid architecture 600. Thus, the DPD capture memory 602.1 may be implemented as any suitable type of addressable memory that is partitioned or otherwise organized to store arrays of data samples of a predetermined size (i.e. length). The DPD capture memory 602.1 may be implemented as a multi-sectored, partitioned capture memory such that data samples may be accessed independently and concurrently across different sectors in the DPD capture memory 602.1 without resulting in access collisions.

Thus, the DPD capture memory 602.1 is configured to store both the output data samples identified with previous data transmissions as well as the feedback data samples as discussed herein. Thus, the DPD capture memory 602.1 stores the output data samples X0 and X1 as discussed above and shown in FIG. 6A, which again represent either the data samples prior to the application of the DPD terms or after the application of the DPD terms, as noted herein. Additionally, the DPD capture memory 602.1 stores the feedback data samples RxFB 0 and RxFB 1 received via the feedback channels as shown in FIG. 6B.

Again, the programmable processing array 608 is configured to compute DPD parameters, which are then used by each of the hardwired portions V2D0, V2D1, V2D2, and V2D3 to determine and apply DPD terms to data samples to be transmitted. The programmable processing array 608 thus computes adapted DPD parameters using the output data samples and the feedback data samples stored in the DPD capture memory 602.1. In this way, the feedback data samples RxFB 0 and RxFB may be used by the programmable processing array 608 to dynamically adapt the DPD parameters, which enable the hardwired DFE 604 to adapt the application of the DPD terms for subsequent data transmissions.

However, timing considerations are needed to ensure that the correct blocks of both output data samples and feedback data samples are used by the programmable processing array 608 as part of the DPD parameter adaptation process. In other words, if the output data samples that are used to compute the DPD parameters do not correlate in time to the feedback data samples corresponding to this same data transmission, then the DPD parameters will not result in a proper compensation of non-idealities in the transmit path.

With continued reference to FIGS. 6A and 6B, the hybrid architecture 600 implements or otherwise references a BFN counter/follower 620 for this purpose. The BEN counter/follower 620 may be implemented as any suitable type of counter or follower configured to count in accordance with any suitable clock cycle that is provided as an input. This clock input may be, in some illustrative and non-limiting scenarios, a clock signal that is referenced to a global clock used for data transmissions, such as the BFN. Thus, the BEN counter/follower 620 may be incremented in accordance with a number of data transmissions and/or data samples that are processed by the respective components of the hybrid architecture 600. Thus, and with respect to the capture memory circuitry 602, the output data samples and the feedback data samples are provided to the programmable processing array 608 in a time-aligned manner based upon an output of the BEN counter/follower 620, and thus the output data samples and the feedback data samples may be time-correlated with one another such that the feedback data samples and the output data samples are correlated with the same previous data transmission. That is, the capture memory circuitry 602 is configured to store the output data samples and the feedback data samples time-correlated with one another in accordance with particular channel used for the previous data transmission Thus, the BEN counter/follower 620 may be programmed with a predetermined counter value, which may represent a start capture value that is aligned with (i.e. synchronized with) a BFN counter time that also maintains synchronization with the data transmissions as noted above. Thus, the BEN counter/follower 620 is implemented as part of the feedback channels as shown in FIG. 6B, and is configured to be incremented, per data sample, as the data samples are sequentially output by each respective sample interface. Upon the number of these data samples matching the predetermined counter value start capture value, the DPD capture memory 602.1 begins storing the feedback data samples sequentially output by the respective sample interface block of each feedback channel as shown in FIG. 6B. This process continues for a predetermined number of data samples, which is also tracked by the BEN counter counter/follower via a programmed counter stop capture value.

The programmed counter stop capture value may represent any suitable predetermined value such that the number of feedback data samples N that are stored in the DPD capture memory 602.1 match a predetermined sample size corresponding to the desired size of the block of feedback data samples. This process then continues over multiple sequential data transmissions, with the DPD capture memory 602.1 sequentially storing blocks of feedback data samples at different times t1, t2, etc., each being referenced to (i.e. aligned and synchronized with) a respective BFN counter time as noted above.

As shown in FIG. 6A, each of the hardwired portions V2D0, V2D1, V2D2, and V2D3 likewise implements a BFN counter 620 such that the DPD capture memory 602.1 also sequentially stores blocks of the output data samples X0 and X1 at different times t1, t2, etc., each being correlated or otherwise referenced to (i.e. aligned and synchronized with) a respective BEN counter time as noted above. In this way, the DPD capture memory 602.1 is configured to store blocks of output data samples and feedback data samples in a time-aligned manner over multiple clock cycles for any suitable number of data transmissions. Each one of the multiple clock cycles may thus be time-referenced to a respective BFN counter time. Thus, "time-aligned" in this context means that the output data samples X0 and X1 stored in the DPD capture memory 602.1 correspond to the feedback data samples stored in the DPD capture memory 602.1 for the same previous data transmission.

Therefore, each respective block of output data samples X0, X1, etc., and feedback data RxFB0, RxFB1, etc., may remain in the DPD capture memory 602.1 until being sent to the programmable processing array 608, as noted above. To facilitate the synchronization of data sent to the programmable processing array 608, the DPD capture memory 602.1 comprises any suitable number of direct memory access (DMA) blocks, with two being shown in FIG. 6B and labeled "DMA0" and "DMA1," each being identified with a respective block of the feedback data samples having the same notation, i.e. RxFB 0 and RxFB 1 as shown in FIG. 6B. Each of these DMA blocks is coupled to the DPD capture memory 602.1 and is configured to release a respective block of the feedback data samples RxFB 0 and RxFB 1 stored in the capture memory 602.1 in a BFN-time controlled manner. That is, the BEN counter 620 provides an output signal (such as the event time as noted above) that triggers each of the DMA blocks to release respective blocks of the output data samples X0, X1 as well as respective blocks of feedback data samples RxFB0, RxFB1. These blocks of data samples may be released over multiple clock cycles based upon their respective sample sizes, but in any event the use of the BEN counter/follower 620 as a reference ensures that the correct blocks of both output and feedback data samples are released from their correct stored partition within the DPD capture memory 602.1. Once released, the output data samples and the feedback data samples are then written to or otherwise provided to the programmable processing array 608, i.e. to the local buffers of the PEs of the programmable processing array 608. Thus, the output data samples and feedback data samples stored in the capture memory 602.1 are released at BFN-controlled times as needed by the programmable processing array 608 to perform DPD parameter adaptation.

Therefore, the programmable processing array 608 receives the output data samples and the feedback data samples stored in the DPD capture memory 602.1 in a time-aligned manner with one another. That is, the output data samples and the feedback data samples are precisely time-aligned via BFN timed captures/releases and fed to the programmable processing array 608 for DPD parameter adaptation. The programmable processing array 608 is configured to perform the DPD parameter adaptation using these sets of data samples (i.e. the output data samples and the feedback data samples). The programmable processing array 608 may execute the DPD parameter computations in accordance with any suitable techniques, including known techniques, that are implemented using a comparison of previously-computed DPD parameters or applied DPD terms, the data samples from the previous data transmission (prior to or after the application of the DPD terms, as the case may be), and/or the feedback measurements of the previous data transmission using those DPD parameters and DPD terms. In this way, the hybrid architecture 600 enables accurate time alignment of the two data sets using BFN timers and gating of the data samples. Furthermore, the hybrid architecture 600 enables maintaining the data samples in the DPD capture memory 602.1 and dispatching the data samples to the processing array 608 when there is enough memory in the local buffers of the PEs of the processing array 608 to process the data.

Figure 7A:
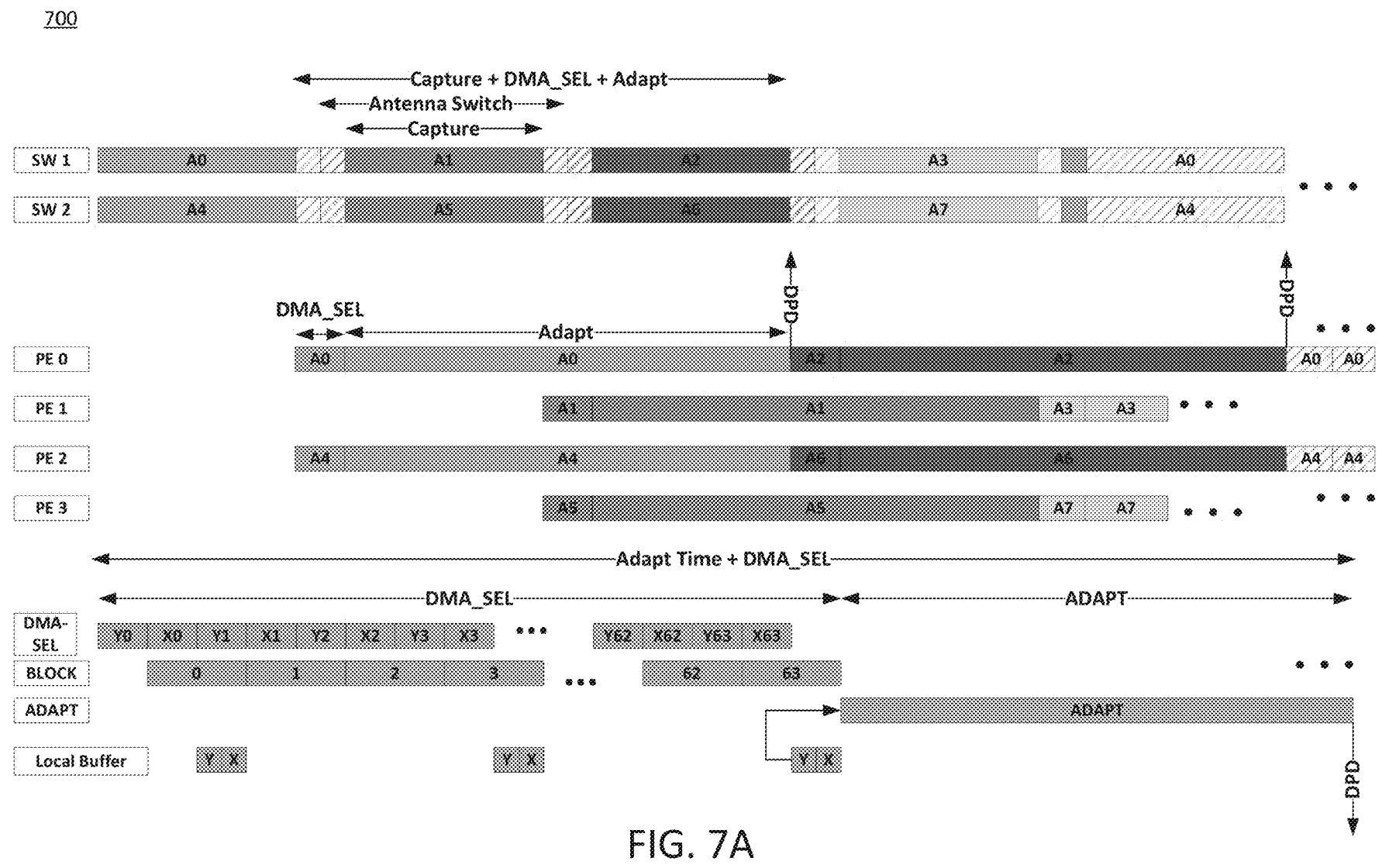
Figure 7B:
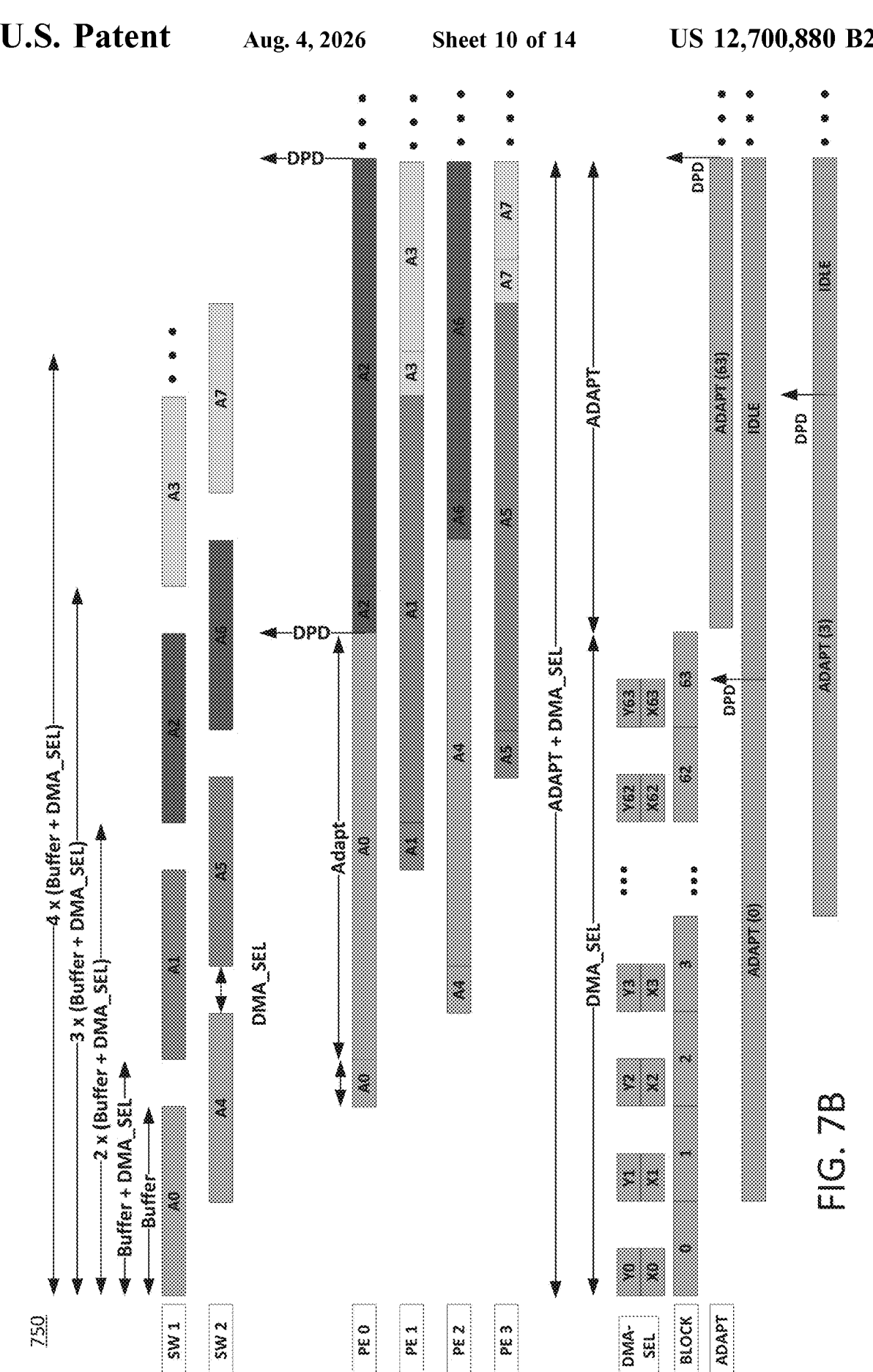
FIG. 7B illustrates a second timing diagram with respect to the adaptation of DPD parameters via a programmable processing array, in accordance with the disclosure.
Figure 7C:
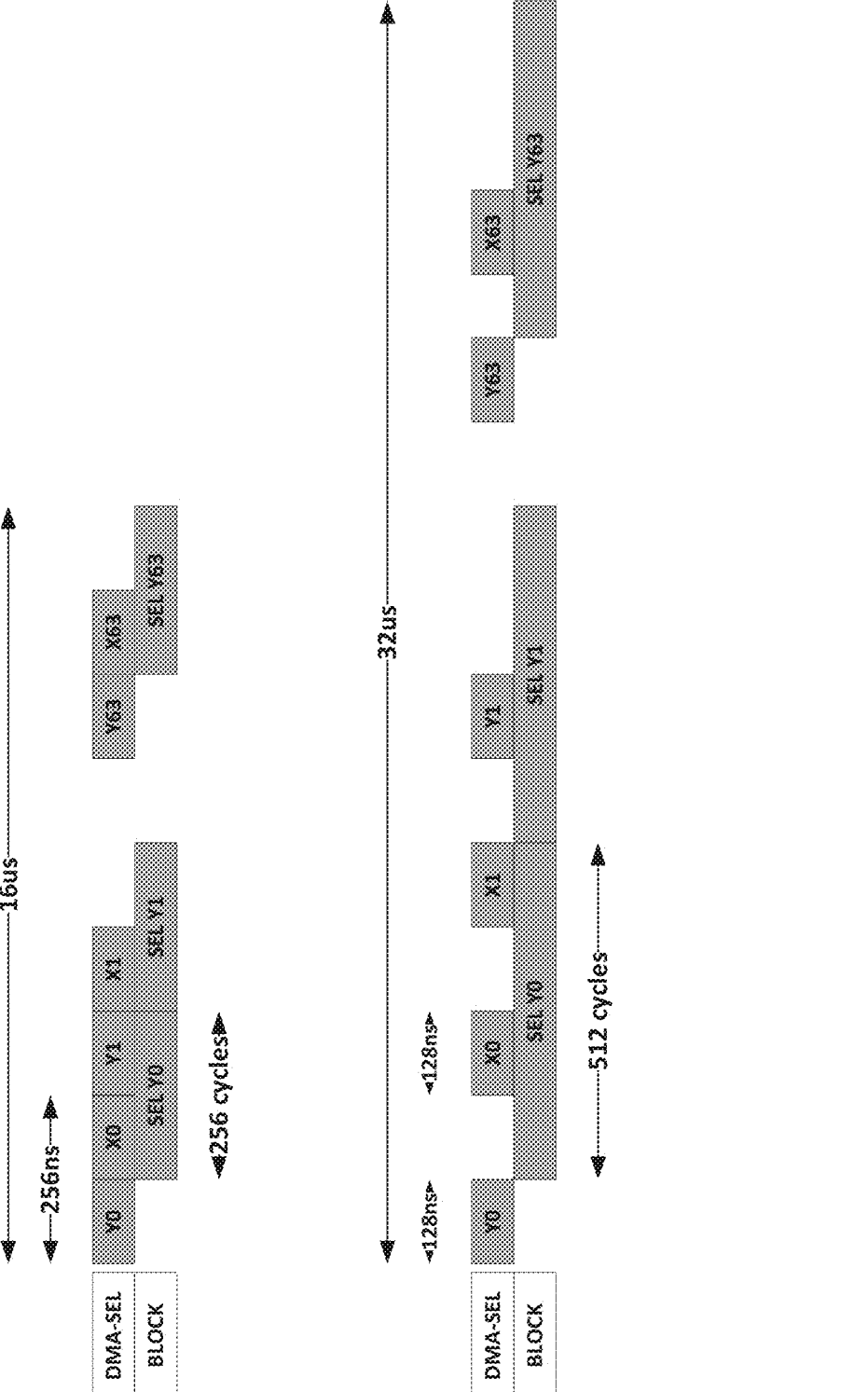
FIG. 7C illustrates a second timing diagram with respect to the adaptation of DPD parameters via a programmable processing array, in accordance with the disclosure.

Furthermore, the use of the BEN control as discussed herein may allow for precise timing control by referencing the BFN counter, and enable the use of different processing flows, which are further discussed herein with reference to FIGS. 7A-7C. Turning now to FIG. 7A, a timing diagram 700 is shown for DPD adaptation processing that is executed via the programmable processing array 608 as shown in FIG. 6A. For the timing diagram 700, a non-limiting and illustrative scenario is referenced that uses the same number of antennas and channels as shown in FIGS. 6A and 6B. That is, the hybrid architecture 600 is assumed to implement 4 antennas per switch, and 8 antennas per capture memory circuitry 602, as shown in FIG. 6B. Thus, the timing diagram 700 may be implemented in accordance with a total of 16 channels, 16 antennas, 4 switch blocks, and 2 of the capture memory circuitries 602 as shown in FIGS. 6A and 6B. For ease of explanation and brevity, the timing diagram 700 is shown with reference to each of the PE blocks PE 01 and PE 23 as shown in FIG. 6A, but is applicable to any suitable number of additional PE blocks that form part of the programmable processing array 608.

With continued reference to FIG. 7A, the switch blocks 606.1, 606.2 may be identified with the timing provided for the switches SW1 and SW2, respectively. Thus, the top two rows as shown in FIG. 7A, which are labeled as "SW1," SW2," correspond to the timing implemented via the switch blocks 606.1, 606.2 to capture (i.e. store) data in the capture memory 602.1 as shown in FIG. 6B. Thus, each respective switch block 606.1, 606.2 selects a corresponding antenna A0, A1, A2, etc. to be coupled to the respective feedback channel, and this operation requires a period of time, which is represented in FIG. 7A via the difference between the "antenna switch" time and the "capture time." Thus, the antenna switch time corresponds to the entire time period in which a corresponding antenna is coupled to the feedback channel, whereas the capture time period represents the time period for the capture memory 602.1 to store a block of feedback data samples received from a respectively coupled antenna. As shown in FIG. 7A, this process is sequentially repeated via each of the switch blocks 606.1, 606.2 such that the capture memory 602.1 sequentially stores feedback data samples (in separate memory partitions) from previous data transmissions.

The next four rows are labeled PE 0, PE 1, PE 2, and PE 3. The timing for each one of these rows represents that of a corresponding channel of the programmable processing array 608 as shown in FIG. 6A. Thus, PE 0 corresponds to the portion of the programmable processing array 608 for channel 0 (such as port 0 as shown in FIG. 5), PE 1 corresponds to the portion of the programmable processing array 608 for channel 1 (both of which being identified with the PE block 01), and so on. With respect to the timing diagram for PE 0 as shown in FIG. 6A, each channelized portion of the programmable processing array 608 receives a block of data samples stored in the capture memory 602.1 during a time period denoted as "DMA_SEL" as shown in FIG. 7A. This time period represents the time needed to load the data samples from the capture memory 602.1 into the PEs of channelized portion PE 0 of the programmable processing array 608. The blocks of data samples may include both the output data samples X0, X1 (for the corresponding previous channel transmission) as well as the feedback data samples RxFB 0, RxFB 1 (for the corresponding previous channel transmission) as discussed above with respect to FIG. 6B.

Thus, it is noted that the timing diagram 700 is not to scale, and is provided as a non-limiting and illustrative timing scenario to demonstrate the timing with respect to the different portions of the hybrid architecture 600. As shown in FIG. 7A, the channelized portion PE 0 of the programmable processing array 608 performs DPD parameter adaptation over a longer period of time. Once these computations have been completed, the adapted DPD parameters are transferred to the respective hardware accelerator (in this case DPD 0), which then computes and applies adapted DPD terms in accordance with the adapted DPD parameters. The channelized portion PE 0 of the programmable processing array 608 (also referred to herein as simply PE 0) then repeats this process for the next block of output data samples and feedback data samples corresponding to antenna 2 and channel 2, as shown in FIG. 7A. It is noted that each of the channelized portion of the programmable processing array 608 may operate in a similar or identical manner, each receiving blocks of output data samples and feedback data samples via the capture memory 602.1 as provided by the DMA blocks 0, 1 and computing the adapted DPD parameters in accordance with the previous channel transmissions. Each channelized portion of the programmable processing array 608 may independently perform these computations, and thus the programmable processing array 608 is configured to execute the DPD adaption process in a quasi-parallel manner, i.e. in parallel but excepting for latency and the availability of data that can be loaded from the capture memory 602.1 due to the sequential switching between different antennas.

Thus, the middle portion of the timing diagram 700 is directed to the overall timing of the programmable processing array 608 with respect to performing the DPD adaptation operations. The bottom portion of the timing diagram 700 provides additional detail with respect to what is referred to herein as a sampling selection mode, which uses further modifications to improve performance. As shown in FIG. 7A, timing is shown in accordance with the sample selection mode in the bottom four rows. These rows are identified with the timing of a single channelized portion of the programmable processing array 608, such as PE 0 as shown in the middle rows of FIG. 7A. This timing diagram is thus shown as a non-limiting and illustrative scenario, and may be utilized by any of the channelized portions of the programmable processing array 608 in a similar or identical manner as shown in FIG. 7A for PE 0.

With continued reference to the bottom four rows in FIG. 7A identified with the optional sample selection mode, the data denoted as 'Y' represents the feedback data samples RxFB (such as RxFB 0 and RxFB 1 as shown in FIGS. 6A and 6B), which corresponds to the feedback data for the previous data transmission as noted above with reference to FIG. 6B for the appropriate antenna and channel, in this case RxFB 1 for antenna A0. The data denoted as 'X' represents the output data samples (such as X0 and X1) as shown in FIGS. 6A and 6B, which again corresponds to the previous data transmission as noted above with reference to FIG. 6A for the appropriate channel, in this case X1 for channel 0 and antenna A0. The row labeled with "DMA-SEL" represents the timing for a time period "DMA_SEL" required for the PEs of PE 0 to load the entirety of a data block identified with the output data samples (X) and feedback data samples (Y) stored in the capture memory 602.1. This may occur over one or multiple clock cycles depending upon the size of the partitions of the capture memory 602.1, the size of the blocks of data samples that may be transferred in a single clock cycle (i.e. the data path width of the hybrid architecture 600), and the size of the local buffers utilized by the PEs of the programmable processing array 608. That is, and as shown in FIG. 5 for the PE 00, the PEs of the programmable processing array 608 may each implement (or alternatively share access to) one or more local buffers. These local buffers may be implemented as any suitable type of memory, and have any suitable configuration of addressable storage, registers, partitions, etc. The use of these local buffers is further discussed below.

Thus, during the time period denoted as "DMA_SEL" as shown in FIG. 7A, PE 0 loads subsets of data blocks X0 . . . X63 and Y0 . . . Y63. These subsets of data blocks each comprise a set of data samples such that all subsets of data samples (i.e. from 0 to 63) equal the total number of data samples represented as "A0" in the SW1 row and the PE 0 row of FIG. 7A (the Figures are not to scale). In other words, each subset of data blocks X0 . . . X63 and Y0 . . . Y63 as shown in FIG. 7A may represent $1/N^{th}$ of the number of data samples in the data block A0 that is eventually loaded into PE 0, with N being 64 in the non-limiting and illustrative scenario as shown in FIG. 7A. This technique of transferring smaller subsets of data blocks in this manner may be particularly useful to accommodate the available buffer memory utilized by the PEs of the programmable processing array and the limitations with respect to how much data may be loaded from the capture memory 602.1 during a single clock cycle.

In other words, the BEN timed captures/releases of the output and feedback data samples stored in the capture memory 602.1 via the DMA blocks may occur over any suitable number of clock cycles, which may be referenced to the BEN counter time as noted herein. In one illustrative and non-limiting scenario, the output and feedback data samples stored in the capture memory 602.1 are provided to the programmable processing array 608 as multiple subsets of data blocks as shown in FIG. 7A, each being provided in a time-aligned manner over multiple "shots" or clock cycles, and with each of the multiple clock cycles being time-referenced to a respective base station frame number (BFN) counter time. Transferring of the subsets of data blocks over multiple clock cycles in this way may be particularly advantageous so as to further reduce memory requirements in the programmable processing array 608 while maintaining precise time alignment.

The next row referenced as "block" represents a time period utilized by PE 0 in which each of the subsets of data blocks X0 . . . X63 and Y0 . . . Y63 is analyzed to determine whether the data will be utilized for DPD adaptation. In other words, the DPD adaptation process is applied to the entire block of data samples for a data transmission, but the data samples used for the computation of the adapted DPD parameters may be identified using a portion of the output data samples and the feedback data samples from the previous data transmission. This is because the samples in a subset of data blocks need to meet one or more predefined qualification criteria to qualify for use in the DPD Parameters adaptation process. These predetermined criteria may be any suitable number and/or type of conditions, and may be identified in accordance with any suitable type of DPD parameters adaptation techniques, including known types. In an non-limiting and illustrative scenario, such qualification criteria may include the data samples identified with a subset of data blocks meeting or exceeding a threshold value or metric such as a signal-to-noise ratio, a power/peak metric based on a sample or a block of samples, etc.

Thus, the block row includes PE 0 identifying whether each subset of data blocks X0 . . . X63 and Y0 . . . Y63 meets the above-referenced qualification criteria. Each numbered block 0, 1, etc. thus represents the time used by the PE 0 to perform processing operations to make this determination for each respective subset of data blocks having the same numeric notation. If the qualification criteria are met for one of the subsets of data blocks, then the output data samples and feedback data samples X. Y are stored in the local buffer of the PE 0 for that particular data block subset. Thus, the bottom row in FIG. 7A represents the timing identified with data being written to the local buffer(s) of the PE 0 for data samples identified with subsets of the data blocks that meet the qualification criteria. The PE 0 may then perform DPD adaptation computations on those data samples stored in the local buffer(s) to compute adapted DPD parameters, which are then transferred to the corresponding hardware accelerator (DPD 0 in this case). Thus, the programmable processing array 608 may use this sampling mode of operation to increase speed and processing efficiency by performing the DPD adaptation operation for only a subset of the output and feedback data samples identified with a previous data transmission.

Turning now to FIG. 7B, a timing diagram 750 is shown for DPD adaptation processing that is executed via the programmable processing array 608 as shown in FIG. 6A. For the timing diagram 750, the same non-limiting and illustrative scenario is referenced as discussed above with reference to the timing diagram 700 of FIG. 7A. That is, for both the timing diagrams 700, 750, the same number of antennas and channels are used as shown in FIGS. 6A and 6B, which includes 16 channels, 16 antennas, 4 switch blocks, and 2 of the capture memory circuitries 602 as shown in FIGS. 6A and 6B.

However, the timing diagram 750 represents a modification with respect to the timing of the programmable processing array 608 receiving the data blocks of output data samples and feedback data samples from the capture memory 602.1. In particular, the top row illustrates the timing for the capture memory 602.1 to store blocks of data samples identified with the antennas A0-A7. In contrast with the direct sequential loading of each of the data blocks as shown in FIG. 7A, the timing diagram 750 as shown in FIG. 7B utilizes a "staggered" approach with respect to the storage of the data blocks. That is, an artificial time delay is introduced in the control of the switch blocks 606.1, 606.2, which may be any suitable length, but may be particularly useful to be set to the same time period "DMA_SEL" that is identified with the transfer of the data blocks to the channelized portions of the programmable processing array 608 as noted above. Thus, the total time between storing each separate block of data samples in the capture memory 602.1 is the sum of the "buffer" time, which may include the time to open and close the switch and write data to the capture memory 602.1, as well as the "DMA_SEL" time identified with transferring the data block to one of the channelized portions of the programmable processing array 608.

The timing diagram 750 thus allows for each switching block 606.1, 606.2, etc. to store respective blocks of data samples in a staggered manner with respect to one another, in contrast to the concurrent storage of data blocks as shown in FIG. 7A. Moreover, this staggered approach also carries over to the timing used by the PE blocks of the programmable processing array 608. That is, PE 0 and PE 2 no longer process data concurrently with one another, as was the case in FIG. 7A. This is also true for PE 1 and PE 3. This implementation may be particularly useful to save system bandwidth, as a strict concurrent storage and subsequent processing of the data blocks is not required due to the introduced artificial time delay.

The timing diagram 750 as shown in FIG. 7B may also optionally utilize a sample selection scheme as discussed above with respect to FIG. 7A. i.e. adapting the DPD parameters using only subsets of data blocks that meet a predetermined qualification criteria. However, the timing diagram 750 further illustrates a parallel use of the DMA block 0 and DMA block 1 as shown in FIG. 6B for this optional sample selection scheme. This allows for each subset of the data blocks X and Y to be concurrently loaded into each channelized portion of the programmable processing array 608. This is achieved by way of the staggered loading of data blocks, as the increased time between storing each data block is increased by the DMA_SEL time as noted above. Thus, each subset of data blocks in this scenario is the same as those discussed above with respect to FIG. 7A, although for the timing diagram 750 the output data samples X and feedback data samples Y are loaded in parallel with one another into the channelized portions of the programmable processing array 608. The remaining block and adapt lines as shown in FIG. 7B are otherwise performed in the same manner as discussed above with respect to the timing diagram 700.

It is also noted that the sample selection scheme as discussed above with respect to FIG. 7A for the aligned capture of data blocks in the capture memory 602.1 may be further modified based upon the particular application. That is, the DMA selection timing may be modified from that shown in FIG. 7A to insert an additional time buffer, i.e. an artificially-created delay, as the subsets of data blocks are loaded into the local buffers of the channelized portions of the programmable processing array 608. To this end, reference is now made to FIG. 7C, which illustrates additional timing diagrams. Both the top and bottom portion of FIG. 7C are identified with the timing diagram as shown in FIG. 7A, which represents a sequential (versus concurrent) loading of the output and feedback data samples X. Y into the channelized portions of the programmable processing array 608 as subsets of data blocks. For the top row as shown in FIG. 7C, no delay is used, and thus the subsets of data blocks containing the output and feedback data samples X. Y are loaded sequentially, one immediately after another. However, for the bottom row, an additional delay is used such that a time period is provided as a buffer between the loading of the feedback data samples Y and the output data samples X. The use of an additional delay in this manner may be particularly useful when the buffers in the programmable processing array 608 are small compared to the size of the subsets of data blocks, thus mitigating the chance of the contents of the local buffers being overwritten at higher operating speeds.

In this way, the DMA blocks 0, 1 as shown in FIG. 6B may adjust their release timings in accordance with a predetermined schedule based upon the size of the number of data samples in each subset of data blocks, the system latency, etc. For reference and case of explanation, sample timings are shown in FIG. 7C for the various operations as shown. These timings are provided in a non-limiting and illustrative sense, and the hybrid architecture 600 may utilize alternate timings in accordance with any suitable type of system specification and/or application.

Again, the bottom portions of the timing diagrams as shown in FIGS. 7A and 7B represent the optional use of a sample selection mode, in which the DPD parameters are computed for subsets of data blocks containing data samples that meet a predetermined qualification criterion. The hybrid architecture 600 may further leverage the sample selection mode to increase speed and efficiency by identifying the subsets of data blocks having data samples that meet the qualification criterion, and loading those subsets of data blocks into the channelized portions of the programmable processing array 608. To do so, it is once again noted that the hybrid architecture 600 may be part of an overall system that comprises a processor such as a CPU or other suitable processing circuitry, as further discussed below with respect to FIG. 9. The programmable processing array 608 may communicate with such processor circuitry to receive processor instructions, as noted above, and optionally to provide additional system information via the use of the Radio Control Subsystem (RCS) and PCIe data signals as further discussed below with respect to subsets of data blocks having data samples that have already been determined as meeting the qualification criteria. The processor circuitry may control the timing and operation of the DMA blocks, such as those shown in FIG. 6B via the use of control signals, which indicate which ranges or partitions of data to release to the programmable processing array 608, and when to do so. Again, this may be based upon the BFN-timer data such that the programmable processing array 608 and the processing circuitry may each identify the appropriate blocks of data samples for DPD adaptation computations.

The programmable processing array may "pre-identify" and/or "pre-select" specific subsets of data blocks that contain data samples that meet the qualification criteria as noted above. The pre-identification and/or pre-selection of the specific subsets of data blocks may occur as a stand-alone, dedicated processing operation that is performed on the forward path, i.e. by the PEs of the programmable processing array 408. Alternatively, the pre-identification and/or pre-selection of the subsets of data blocks may be executed as part of other processing operations executed by the programmable processing array 408. These processing operations may comprise any suitable type of processing operations as discussed herein, such as DFE-based processing operations that comprise the execution of DFE functions. Such processing operations may be executed in accordance with any suitable preprocessing steps that may be executed via the programmable processing array 408, and such preprocessing operations and/or steps may comprise the pre-identification and/or pre-selection of the specific subsets of data blocks. Some non-limiting and illustrative scenarios comprising such preprocessing operations and/or steps may include signal filtering, up/down sampling, crest-factor reduction, DPD-related preprocessing and modifications, etc.

In any event, as the pre-identification and/or pre-selection of the specific subsets of data blocks is performed, the X0, X1 data samples (which may be the computed DPD parameters in this scenario) may be identified via the BEN counter time, channel, and index (i.e. X0, X7, etc.) with respect to the larger block of data samples to which the DPD terms have been applied by the hardware accelerators DPD 0, DPD 1, etc. Then, the programmable processing array 608 may provide this information to the processing circuitry via the use of the RCS and PCIe data signals, as shown in FIG. 6A. The processing circuitry may then "pre-schedule" (via the DMA blocks 0, 1) the release of the subsets of the X data blocks and the corresponding subsets of the Y data blocks that correspond to those X data samples for the same time, channel, and index as that indicated via the programmable processing array 608.

In this way, only the portion of the output data samples and the portion of the feedback data samples that meet the predefined qualification criteria are loaded into the local buffer(s) of the programmable processing array 608. By selecting samples directly in this way, it is ensured that a larger percentage of samples identified with each data block are considered, which can improve the DPD adaptation speed. Thus, although the programmable processing array 608 may directly select the subsets of the X and Y data blocks in this way, this requires a significant level of interaction with the processor circuitry (i.e. the control (RCS) system).

Therefore, an alternative scenario may be provided such that only the needed subsets of the X data blocks (i.e. those with data samples meeting the qualification criteria) are loaded into the channelized portions of the programmable processing array 608, whereas all Y data sample blocks remain stored in the capture memory 602.1 until needed. Then, the subsets of X data blocks may be processed while only the required corresponding subsets of the Y data samples are loaded into the channelized portions of the programmable processing array 608.

Figure 7D:
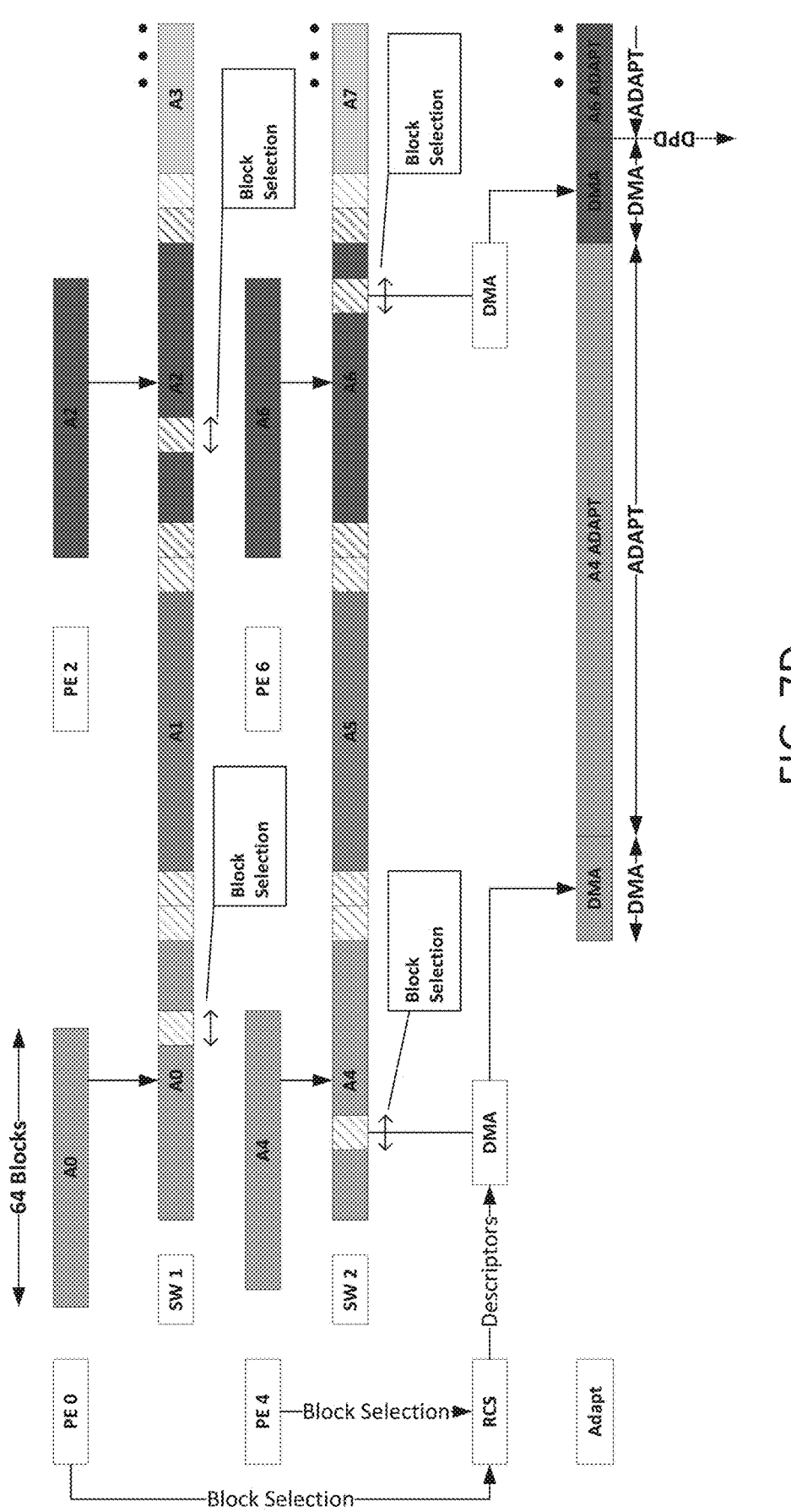
FIG. 7D illustrates a timing diagram for data block selection in the forward path, in accordance with the disclosure.

Such a scenario is shown in further detail in the timing diagram of FIG. 7D, which corresponds to a timing diagram for data block selection in the forward path. The forward path in this context is with respect to the DPD parameter adaptation computations performed via the PE blocks of the programmable processing array 608. With continued reference to FIG. 7D, in this illustrative scenario the PE blocks 0, 2, 4, and 6 of the programmable processing array 608 have each indicated to the RCS respective subsets of data blocks that contain data samples that meet the qualification criteria as noted above. Of course, any suitable number (or all) of the PE blocks of the programmable processing array 608 may likewise make such indications, with the four being shown in FIG. 7D as an illustrative scenario for ease of explanation. Each PE block may thus communicate to the RCS as shown in FIG. 7D the specific subsets of data blocks, which may include a smallest data block unit (such as a single data block as the subset of data blocks) or any suitable portion thereof of the larger data block stored in the capture memory circuitry 602 as discussed herein.

This is denoted as shown in FIG. 7D via the "block selection," which represents an indication to the RCS (via each respective PE block) of the specific range of data samples within each larger data block that corresponds to the subset of data samples that meet the predefined qualification criteria for DPD adaptation to be performed. Thus, the RCS (or other suitable processor) may use this information received from each PE block to provide descriptors (DESC) to the DMAs 0, 1, etc. of the capture memory circuitry 602. It is noted that the descriptor blocks identified with the DMAs of the capture memory circuitry 602 are generally known, and thus additional detail regarding the descriptor information in accordance with the operation of DMAs is not provided herein for purposes of brevity. The DMAs of the capture memory circuitry 602 may utilize descriptor information in any of the techniques as discussed herein, although the scenario discussed with respect to FIG. 7D may be particularly useful when a significantly smaller subset of data blocks are to be loaded into the PE blocks of the programmable processing array 608. In any event, the PE blocks provide the information to the RCS, which is used to generate the descriptor information for the DMAs. In response to the receipt of this descriptor information, the capture memory circuitry 602 may release the data blocks identified with the specific ranges of data samples as identified by the PE arrays to a corresponding PE block that is to perform the DPD adaptation computations.

As yet another alternative scenario, both subsets of X data blocks and Y data blocks may remain stored in the capture memory 602.1 until needed. However, only the subsets of data blocks for both the X and the Y data samples that meet the qualification criteria are transferred to the channelized portions of the programmable processing array 608. This transfer process may be performed once the DPD adaptation computations have been completed for a previous data transmission. Thus, the block selection as shown in FIG. 7D may be implemented to transfer only the needed subsets of the X data blocks meeting the qualification criteria to the PE blocks or, alternatively, the subsets of data blocks for both the X and the Y data samples that meet the qualification criteria.

Still further, in yet another alternative scenario, the capture memory circuitry 602 may capture and store only the specific subsets of data blocks that meet the qualification criteria. Thus, it is noted that the switch is open for a specific time period as shown in FIG. 7D to allow for the capture memory circuitry 602 to capture an entire data block (such as A0, A4, etc.) of data samples. For case of explanation, with reference to FIG. 7D, in this alternative scenario the capture memory circuitry 602 may advantageously store in the DPD capture memory 602.1 only those specific subsets of data blocks within such a respective entire data block that meet the qualification criteria, which are indicated in FIG. 7D via the "block selection" label. Thus, in such scenarios the various PE blocks of the programmable processing array 608 may communicate with the RCS to indicate the pre-identified subsets of data blocks, as noted above. The RCS may then communicate with the capture memory circuitry 602, as show in FIG. 6A, such that the capture memory circuitry 602 only stores the identified subsets of data blocks in the DPD capture memory 602.1 that meet the qualification criteria. Again, the use of the BEN counter/follower 620 may enable the RCS to identify the specific subsets of data samples via a reference and/or correlation to a specific BEN counter time. The capture memory circuitry 602 may use such a referenced BFN counter time, or any other suitable global reference clock, to identify the specific subsets of data samples within each larger respective data block (such as A0, A4, etc., as shown in FIG. 7D). In this way, although the switch position may remain open for a longer period of time that constitutes a sampling interval, the capture memory circuitry 602 may store only those subsets of data samples within each sampling interval as indicated by the RCS (or other suitable processing/control system) that have been identified as meeting the qualification criteria, as noted herein. Such operation scenarios may be particularly efficient, as the capture memory circuitry 602 may be reduced in size, and the bandwidth needed for DPD adaptation is significantly reduced.

Figure 8:
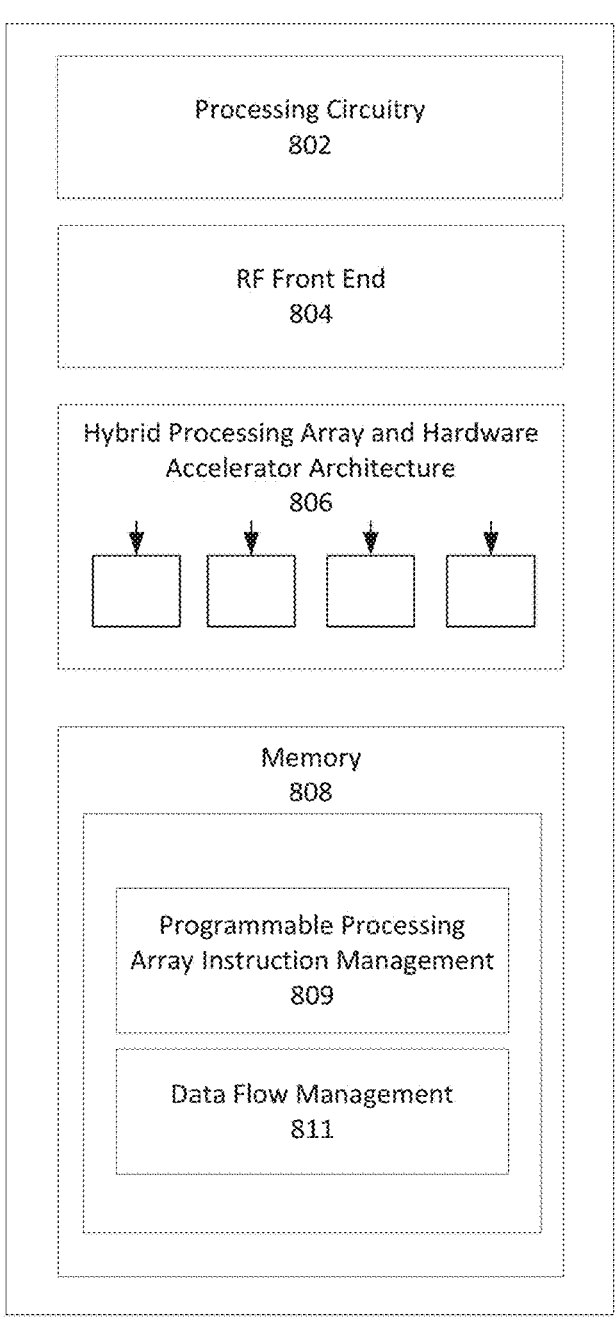
FIG. 8 illustrates an example device, in accordance with the disclosure.

FIG. 8 illustrates an example device, in accordance with the disclosure. The device 800 may be identified with one or more devices implementing a hybrid architecture, such as the hybrid architecture 600 as shown and discussed herein with reference to FIGS. 6A-6B. The device 800 may be identified with a wireless device, a user equipment (UE) or other suitable device configured to perform wireless communications such as a mobile phone, a laptop computer, a wireless communications base station, a tablet, etc., and which may include one or more components configured to transmit and receive radio signals and to use processing operations as discussed herein in accordance with wirelessly transmitted and/or received data, which may include DPD and DPD parameter and term adaptation-based computations.

As further discussed below, the device 800 may perform the DPD parameter and term adaptation-based computations as discussed herein with respect to the hybrid architecture 600 as shown and discussed with respect to FIGS. 6A-6B. To do so, the device 800 may include processing circuitry 802, an RF front end 804, a hybrid processing array and hardware accelerator architecture 806, and a memory 808. The components shown in FIG. 8 are provided for case of explanation, and the device 800 may implement additional, less, or alternative components as those shown in FIG. 8.

The processing circuitry 802 may be configured as any suitable number and/or type of processing circuitry and/or computer processors, which may function to control the device 800 and/or other components of the device 800. The processing circuitry 802 may be identified with one or more processors (or suitable portions thereof) implemented by the device 800 or a host system, SoC, etc., that implements the hybrid architecture 600. The processing circuitry 802 may be identified with one or more processors such as a host processor, a digital signal processor, a control (RCS) system, one or more microprocessors, graphics processors, baseband processors, microcontrollers, an application-specific integrated circuit (ASIC), part (or the entirety of) a field-programmable gate array (FPGA), etc.

In any event, the processing circuitry 802 may be configured to carry out instructions to perform arithmetical, logical, and/or input/output (I/O) operations, and/or to control the operation of one or more components of device 800 to perform various functions as described herein. The processing circuitry 802 may include one or more microprocessor cores, memory registers, buffers, clocks, etc., and may generate electronic control signals associated with the components of the device 800 to control and/or modify the operation of these components. The processing circuitry 802 may communicate with and/or control functions associated with the RF front end 804, the hybrid architecture 806, and/or the memory 808.

The RF front end 804 may be identified with the RF front end 406 as shown in FIG. 4, and may be implemented as any suitable type number and/or type of components to facilitate such functionality, which may be components ordinarily associated with transceiver, transmitter, and/or receiver designs. Again, the RF front end 804 may comprise any suitable number of RF transmit and receive chains, each being associated with one or more respective channels and/or antennas, and comprising any suitable number of components such as up-samplers, power amplifiers (PAs), RF filters, sample interfaces, down-samplers, mixers, local oscillators, filters, switching blocks, other suitable types of amplifiers, channel tuners, etc.

The hybrid processing array and hardware accelerator architecture 806 may be identified with the hybrid architecture 600 as shown in FIGS. 6A-6B, which may again be identified with the capture memory circuitry 402, the hard-wired DFE 404, and the programmable processing array 408 as shown and discussed above with respect to FIG. 4. The hybrid processing array and hardware accelerator architecture 806 may thus be implemented as any suitable number and/or type of components configured to transmit and/or receive data and/or wireless signals in accordance with any suitable number and/or type of communication protocols. The data received via the hybrid architecture 806, data provided to the hybrid architecture 806 for transmission, and/or data used in conjunction with the transmission and/or reception of data (DPD parameters and/or terms, etc.) may be processed via the hybrid architecture 806 in accordance with the various data flows as discussed herein.

The memory 808 stores data and/or instructions such that, when the instructions are executed by the processing circuitry 802, cause the device 800 to perform various functions as described herein with respect to the hybrid processing array and hardware accelerator architecture 606, such as controlling, monitoring, and/or regulating the flow of data. The memory 808 may be implemented as any suitable type of volatile and/or non-volatile memory, including read-only memory (ROM), random access memory (RAM), flash memory, a magnetic storage media, an optical disc, erasable programmable read only memory (EPROM), programmable read only memory (PROM), etc. The memory 808 may be non-removable, removable, or a combination of both. The memory 808 may be implemented as a non-transitory computer readable medium storing one or more executable instructions such as, for example, logic, algorithms, code, etc.

As further discussed below, the instructions, logic, code, etc., stored in the memory 808 are represented by the various modules as shown, which may enable the functionality disclosed herein to be functionally realized. Alternatively, the modules as shown in FIG. 8 that are associated with the memory 808 may include instructions and/or code to facilitate control and/or monitor the operation of hardware components implemented via the device 800. In other words, the modules shown in FIG. 8 are provided for case of explanation regarding the functional association between hardware and software components. Thus, the processing circuitry 802 may execute the instructions stored in these respective modules in conjunction with one or more hardware components to perform the various functions as discussed herein.

The executable instructions stored in the programmable processing array instruction management module 809 may facilitate, in conjunction with execution via the processing circuitry 802, the device 800 receiving and decoding processor instructions (which may be sent via the processing circuitry 802 or other suitable component of the device 800 or a component external to the device 800), and providing arrays of data samples to the PEs within the processing array portion of the hybrid architecture 806 (such as via the various data interfaces and buffers as discussed herein). Additionally or alternatively, the executable instructions stored in the programmable processing array instruction management module 809 may facilitate, in conjunction with execution via the processing circuitry 802, the device 800 performing the functions of the hybrid architectures 600 as discussed herein. The functionality provided by the programmable processing array instruction management module 809 is a function of the particular implementation and/or type of processing array implemented via the device 800.

Thus, if a vector processor is implemented, then the programmable processing array instruction management module 809 may facilitate the determination of each specific vector processor instruction to perform specific types of vector processing operations and/or any of the functionality with respect to a vector processor architecture such as the retrieval of vector data samples from vector registers, performing vector processing operations and/or computations, providing the results of vector processing operations to the hardware accelerator portion of the hybrid processing array and hardware accelerator architecture 806, etc. Of course, in the event that the device 800 implements an FPGA, DSP, or other suitable type of processing array architecture, then the programmable processing array instruction management module 809 may function to translate and/or decode instructions to identify the type of processing operations and/or calculations to perform on arrays of data samples in an analogous manner as the use of a vector processor.

The executable instructions stored in the data flow management module 811 may facilitate, in conjunction with execution via the processing circuitry 802, the routing of the arrays or blocks of data samples within the hybrid architecture 806. This may include routing blocks of data and/or subsets of the blocks of data samples within the hybrid processing array and hardware accelerator architecture 806, to the various sample interfaces of the RF front end 804, converting arrays of data samples to a format recognized by the hardware accelerators DPD 0, DPD 1, etc., and vice-versa. Thus, the executable instructions stored in the data flow management module 811 may facilitate routing and processing of the data samples within the hybrid architecture 600, as discussed herein.

General Operation of an SoC

A system on a chip (SoC) is provided, which may be with reference to an SoC implementing the hybrid architecture 400 as shown in FIG. 4. The SoC comprises a memory configured to (i) store output data samples identified with a first data transmission, and (ii) store feedback data samples obtained via a feedback measurement that is performed with respect to the first data transmission. The SoC further comprises a processing array configured to compute adapted digital pre-distortion (DPD) parameters using (i) the output data samples, and (ii) the feedback data samples; and a hardware accelerator configured to apply, to transmit (TX) data samples identified with a second data transmission, DPD terms in accordance with the adapted DPD parameters, wherein the output data samples and the feedback data samples are provided to the processing array in a time-aligned manner based upon a base station frame number (BFN) counter. Furthermore, the output data samples comprise data samples that are input to the hardware accelerator prior to the application of the DPD terms by the hardware accelerator in accordance with the first data transmission. In addition or in alternative to and in any combination with the optional features previously explained in this paragraph, the output data samples comprise data samples that are output by the hardware accelerator after the application of the DPD terms by the hardware accelerator in accordance with the first data transmission. In addition or in alternative to and in any combination with the optional features previously explained in this paragraph, the SoC further comprises a hardwired digital front end (DFE) comprising the hardware accelerator, the hardwired DFE comprising a multiplexer configured to selectively output, as the output data samples, one of (i) DPD parameters that are used by the hardware accelerator to determine the applied DPD terms in accordance with the first data transmission, or (ii) the applied DPD terms that are determined by the hardware accelerator using the DPD parameters associated with the first data transmission. In addition or in alternative to and in any combination with the optional features previously explained in this paragraph, the SoC further comprises capture memory circuitry comprising a base station frame number (BFN) counter/follower, the capture memory circuitry being configured to store the feedback data samples in the memory time-correlated to the output data samples associated with the first data transmission. In addition or in alternative to and in any combination with the optional features previously explained in this paragraph, the first data transmission is identified with a channel from among a plurality of different channels, and the capture memory circuitry is configured to store the feedback data samples time-correlated to the output data samples associated with the channel used for the first data transmission. In addition or in alternative to and in any combination with the optional features previously explained in this paragraph, the SoC further comprises a hardwired digital front end (DFE) comprising a plurality of hardwired portions, each one of the plurality of hardwired portions comprising a respective hardware accelerator coupled to a multiplexer network, and each respective one of the multiplexer networks is configured to selectively provide, to the capture memory circuitry, output data samples generated via a respectively coupled hardware accelerator correlated to a respective base station frame number (BFN) counter time. In addition or in alternative to and in any combination with the optional features previously explained in this paragraph, the capture memory circuitry is configured to store blocks of output data samples in a time-aligned manner over multiple clock cycles, each one of the multiple clock cycles being time-referenced to a respective base station frame number (BFN) counter time. In addition or in alternative to and in any combination with the optional features previously explained in this paragraph, the processing array is configured to compute the adapted DPD parameters using one of a subset of data blocks comprising a portion of the output data samples and a portion of feedback data samples that meet a predefined qualification criteria. In addition or in alternative to and in any combination with the optional features previously explained in this paragraph, upon the processing array determining that the portion of the output data samples and the portion of the feedback data samples meet the predefined qualification criteria, the one of the subset of data blocks is loaded into the processing array. In addition or in alternative to and in any combination with the optional features previously explained in this paragraph, the output data samples and the feedback data samples are identified with a data block, and the processing array is configured to: receive subsets of data blocks identified with the data block, each one of the subsets of data blocks comprising a portion of the output data samples and a portion of the feedback data samples, which are concurrently received by the processing array; and to compute the adapted DPD parameters using one of the subsets of data blocks having data samples that meet a predefined qualification criteria.

General Operation of a Wireless Device

A wireless device is provided, which may be with reference to the wireless device 800 as shown in FIG. 8. The wireless device comprises a memory configured to (i) store output data samples identified with a first data transmission, and (ii) store feedback data samples obtained via a feedback measurement that is performed with respect to the first data transmission. The wireless device further comprises a programmable processing array configured to compute adapted digital pre-distortion (DPD) parameters using (i) the output data samples, and (ii) the feedback data samples, and a hardware accelerator configured to apply, to transmit (TX) data samples identified with a second data transmission, DPD terms in accordance with the adapted DPD parameters, wherein the output data samples and the feedback data samples are provided to the programmable processing array in a time-aligned manner based upon a base station frame number (BFN) counter. Furthermore, the output data samples comprise DPD parameters that are input to the hardware accelerator prior to the application of the DPD terms by the hardware accelerator in accordance with the first data transmission. In addition or in alternative to and in any combination with the optional features previously explained in this paragraph, the output data samples comprise data samples that are output by the hardware accelerator after the application of the DPD terms by the hardware accelerator in accordance with the first data transmission. In addition or in alternative to and in any combination with the optional features previously explained in this paragraph, the wireless device further comprises a hardwired digital front end (DFE) comprising the hardware accelerator, the hardwired DFE comprising a multiplexer configured to selectively output, as the output data samples, one of (i) DPD parameters that are used by the hardware accelerator to determine the applied DPD terms in accordance with the first data transmission, or (ii) the applied DPD terms that are determined by the hardware accelerator using the DPD parameters associated with the first data transmission. In addition or in alternative to and in any combination with the optional features previously explained in this paragraph, the wireless device further comprises capture memory circuitry comprising a base station frame number (BFN) counter/follower, the capture memory circuitry being configured to store the feedback data samples in the memory time-correlated to the output data samples associated with the first data transmission. In addition or in alternative to and in any combination with the optional features previously explained in this paragraph, the first data transmission is identified with a channel from among a plurality of different channels, and wherein the capture memory circuitry is configured to store the feedback data samples time-correlated to the output data samples associated with the channel used for the first data transmission. In addition or in alternative to and in any combination with the optional features previously explained in this paragraph, the wireless device further comprises a hardwired digital front end (DFE) comprising a plurality of hardwired portions, each one of the plurality of hardwired portions comprising a respective hardware accelerator coupled to a multiplexer network, and wherein each respective one of the multiplexer networks is configured to selectively provide, to the capture memory circuitry, output data samples generated via a respectively coupled hardware accelerator correlated to a respective base station frame number (BFN) counter time. In addition or in alternative to and in any combination with the optional features previously explained in this paragraph, the capture memory circuitry is configured to store blocks of output data samples in a time-aligned manner over multiple clock cycles, each one of the multiple clock cycles being time-referenced to a respective base station frame number (BFN) counter time. In addition or in alternative to and in any combination with the optional features previously explained in this paragraph, the programmable processing array is configured to compute the adapted DPD parameters using one of a subset of data blocks comprising a portion of the output data samples and a portion of feedback data samples that meet a predefined qualification criteria. In addition or in alternative to and in any combination with the optional features previously explained in this paragraph, upon the processing array determining that the portion of the output data samples and the portion of the feedback data samples meet the predefined qualification criteria, the one of the subset of data blocks is loaded into the processing array. In addition or in alternative to and in any combination with the optional features previously explained in this paragraph, the output data samples and the feedback data samples are identified with a data block, and wherein the programmable processing array is configured to: receive subsets of data blocks identified with the data block, each one of the subsets of data blocks comprising a portion of the output data samples and a portion of the feedback data samples, which are concurrently received by the processing array; and compute the adapted DPD parameters using one of the subsets of data blocks having data samples that meet a predefined qualification criteria.

A Process Flow

Figure 9:
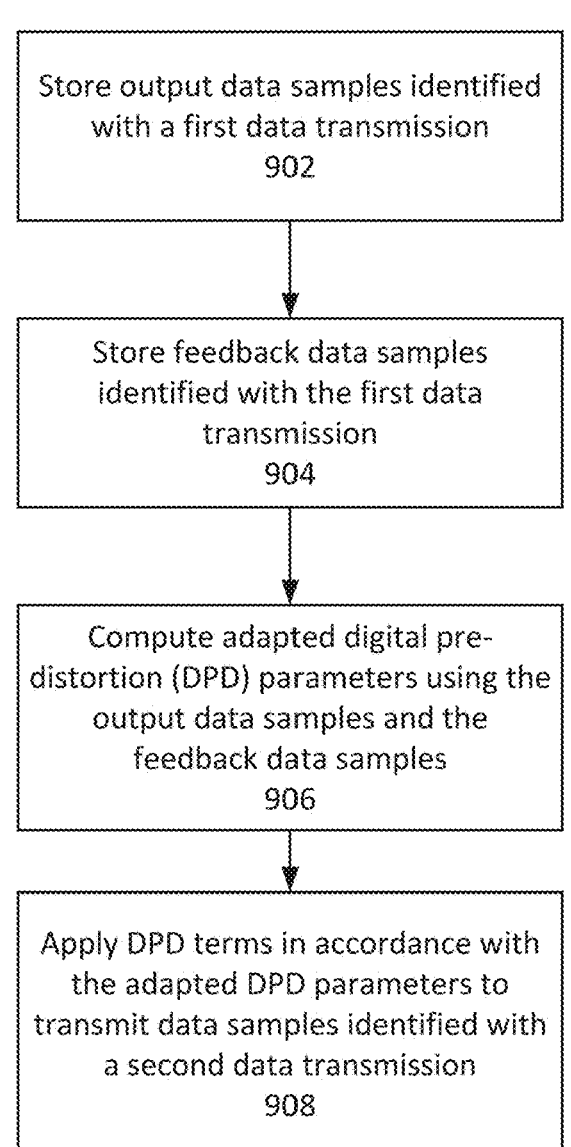
FIG. 9 illustrates a process flow, in accordance with the disclosure.

FIG. 9 illustrates a process flow. With reference to FIG. 9, the process flow 900 may be a computer-implemented method executed by and/or otherwise associated with one or more processors (processing circuitry) and/or storage devices. These processors and/or storage devices may be associated with one or more components of the hybrid architecture 600 as discussed herein and/or one or more components of the device 800 as discussed herein. The processors and/or storage devices may be identified with one or more components of the hybrid architecture 600, such as the hardware accelerators DPD 0, DPD 1, etc., the PEs of the programmable processing array 608, and/or the processing circuitry 802. The flow 900 may include alternate or additional steps that are not shown in FIG. 9 for purposes of brevity, and may be performed in a different order than the steps shown in FIG. 9.

Flow 900 may begin when one or more processors store (block 902) a output data samples identified with a first data transmission. These output data samples may correspond to the 'X' data samples as discussed herein, such as the X0, X1 output data samples as shown in FIGS. 6A and 6B. Again, these output data samples may correspond to the data samples prior to or after the application of the DPD terms that are computed using the DPD parameters via any of the hardware accelerators DPD 0, DPD 1, DPD 2, DPD 3, etc., as discussed above with reference to FIGS. 6A-6B.

Flow 900 may include one or more processors storing (block 904) feedback data samples received via a feedback measurement identified with the transmission of the data samples in accordance with the first data transmission. These feedback data samples may correspond to the 'Y' data samples as discussed herein, such as the RxFB0, RxFB1, etc. data samples as shown in FIGS. 6A and 6B.

Flow 900 may include one or more processors computing (block 906) adapted (i.e. updated) DPD parameters using the stored output data samples and feedback data samples, which may be received or otherwise provided in a time-aligned manner based upon a base station frame number (BFN) counter. This may include providing the processing array 608 with the subsets of data blocks including portions of the output and feedback data samples in accordance with any of the timing diagrams and data flows as discussed above with respect to FIGS. 7A-7C.

Flow 900 may include one or more processors applying (block 908) DPD terms to TX data samples identified with a second subsequent data transmission. This may include the hardware accelerators DPD 0, DPD 1, etc. accessing the computed DPD parameters and then applying, in accordance with the computed DPD parameters, the DPD terms to subsequent data samples to perform DPD adaptation, as noted above.

EXAMPLES

The following examples pertain to various techniques of the present disclosure.

An example (e.g. example 1) is directed to a system on a chip (SoC), comprising: a memory configured to (i) store output data samples identified with a first data transmission, and (ii) store feedback data samples obtained via a feedback measurement that is performed with respect to the first data transmission; a processing array configured to compute adapted digital pre-distortion (DPD) parameters using (i) the output data samples, and (ii) the feedback data samples; and a hardware accelerator configured to apply, to transmit (TX) data samples identified with a second data transmission, DPD terms in accordance with the adapted DPD parameters, wherein the output data samples and the feedback data samples are provided to the processing array in a time-aligned manner based upon a base station frame number (BFN) counter.

Another example (e.g. example 2) relates to a previously-described example (e.g. example 1), wherein the output data samples comprise data samples that are input to the hardware accelerator prior to the application of the DPD terms by the hardware accelerator in accordance with the first data transmission.

Another example (e.g. example 3) relates to a previously-described example (e.g. one or more of examples 1-2), wherein the output data samples comprise data samples that are output by the hardware accelerator after the application of the DPD terms by the hardware accelerator in accordance with the first data transmission.

Another example (e.g. example 4) relates to a previously-described example (e.g. one or more of examples 1-3), further comprising: a hardwired digital front end (DFE) comprising the hardware accelerator, the hardwired DFE comprising a multiplexer configured to selectively output, as the output data samples, one of (i) DPD parameters that are used by the hardware accelerator to determine the applied DPD terms in accordance with the first data transmission, or (ii) the applied DPD terms that are determined by the hardware accelerator using the DPD parameters associated with the first data transmission.

Another example (e.g. example 5) relates to a previously-described example (e.g. one or more of examples 1-4), further comprising: capture memory circuitry comprising a base station frame number (BFN) counter/follower, the capture memory circuitry being configured to store the feedback data samples in the memory time-correlated to the output data samples associated with the first data transmission.

Another example (e.g. example 6) relates to a previously-described example (e.g. one or more of examples 1-5), wherein the first data transmission is identified with a channel from among a plurality of different channels, and wherein the capture memory circuitry is configured to store the feedback data samples time-correlated to the output data samples associated with the channel used for the first data transmission.

Another example (e.g. example 7) relates to a previously-described example (e.g. one or more of examples 1-6), further comprising: a hardwired digital front end (DFE) comprising a plurality of hardwired portions, each one of the plurality of hardwired portions comprising a respective hardware accelerator coupled to a multiplexer network, and wherein each respective one of the multiplexer networks is configured to selectively provide, to the capture memory circuitry, output data samples generated via a respectively coupled hardware accelerator correlated to a respective base station frame number (BFN) counter time.

Another example (e.g. example 8) relates to a previously-described example (e.g. one or more of examples 1-7), wherein the capture memory circuitry is configured to store blocks of output data samples in a time-aligned manner over multiple clock cycles, each one of the multiple clock cycles being time-referenced to a respective base station frame number (BFN) counter time.

Another example (e.g. example 9) relates to a previously-described example (e.g. one or more of examples 1-8), wherein the processing array is configured to compute the adapted DPD parameters using one of a subset of data blocks comprising a portion of the output data samples and a portion of feedback data samples that meet a predefined qualification criteria.

Another example (e.g. example 10) relates to a previously-described example (e.g. one or more of examples 1-9), wherein upon the processing array determining that the portion of the output data samples and the portion of the feedback data samples meet the predefined qualification criteria, the one of the subset of data blocks is loaded into the processing array.

Another example (e.g. example 11) relates to a previously-described example (e.g. one or more of examples 1-10), wherein the output data samples and the feedback data samples are identified with a data block, and wherein the processing array is configured to: receive subsets of data blocks identified with the data block, each one of the subsets of data blocks comprising a portion of the output data samples and a portion of the feedback data samples, which are concurrently received by the processing array; and compute the adapted DPD parameters using one of the subsets of data blocks having data samples that meet a predefined qualification criteria.

An example (e.g. example 12) relates to a wireless device, comprising: a memory configured to (i) store output data samples identified with a first data transmission, and (ii) store feedback data samples obtained via a feedback measurement that is performed with respect to the first data transmission; and a programmable processing array configured to compute adapted digital pre-distortion (DPD) parameters using (i) the output data samples, and (ii) the feedback data samples; and a hardware accelerator configured to apply, to transmit (TX) data samples identified with a second data transmission, DPD terms in accordance with the adapted DPD parameters, wherein the output data samples and the feedback data samples are provided to the programmable processing array in a time-aligned manner based upon a base station frame number (BFN) counter.

Another example (e.g. example 13) relates to a previously-described example (e.g. example 12), wherein the output data samples comprise DPD parameters that are input to the hardware accelerator prior to the application of the DPD terms by the hardware accelerator in accordance with the first data transmission.

Another example (e.g. example 14) relates to a previously-described example (e.g. one or more of examples 12-13), wherein the output data samples comprise data samples that are output by the hardware accelerator after the application of the DPD terms by the hardware accelerator in accordance with the first data transmission.

Another example (e.g. example 15) relates to a previously-described example (e.g. one or more of examples 12-14), further comprising: a hardwired digital front end (DFE) comprising the hardware accelerator, the hardwired DFE comprising a multiplexer configured to selectively output, as the output data samples, one of (i) DPD parameters that are used by the hardware accelerator to determine the applied DPD terms in accordance with the first data transmission, or (ii) the applied DPD terms that are determined by the hardware accelerator using the DPD parameters associated with the first data transmission.

Another example (e.g. example 16) relates to a previously-described example (e.g. one or more of examples 12-15), further comprising: capture memory circuitry comprising a base station frame number (BFN) counter/follower, the capture memory circuitry being configured to store the feedback data samples in the memory time-correlated to the output data samples associated with the first data transmission.

Another example (e.g. example 17) relates to a previously-described example (e.g. one or more of examples 12-16), wherein the first data transmission is identified with a channel from among a plurality of different channels, and wherein the capture memory circuitry is configured to store the feedback data samples time-correlated to the output data samples associated with the channel used for the first data transmission.

Another example (e.g. example 18) relates to a previously-described example (e.g. one or more of examples 12-17), further comprising: a hardwired digital front end (DFE) comprising a plurality of hardwired portions, each one of the plurality of hardwired portions comprising a respective hardware accelerator coupled to a multiplexer network, and wherein each respective one of the multiplexer networks is configured to selectively provide, to the capture memory circuitry, output data samples generated via a respectively coupled hardware accelerator correlated to a respective base station frame number (BFN) counter time.

Another example (e.g. example 19) relates to a previously-described example (e.g. one or more of examples 12-18), wherein the capture memory circuitry is configured to store blocks of output data samples in a time-aligned manner over multiple clock cycles, each one of the multiple clock cycles being time-referenced to a respective base station frame number (BFN) counter time.

Another example (e.g. example 20) relates to a previously-described example (e.g. one or more of examples 12-19), wherein the programmable processing array is configured to compute the adapted DPD parameters using one of a subset of data blocks comprising a portion of the output data samples and a portion of feedback data samples that meet a predefined qualification criteria.

Another example (e.g. example 21) relates to a previously-described example (e.g. one or more of examples 12-20), wherein upon the processing array determining that the portion of the output data samples and the portion of the feedback data samples meet the predefined qualification criteria, the one of the subset of data blocks is loaded into the processing array.

Another example (e.g. example 22) relates to a previously-described example (e.g. one or more of examples 12-21), wherein the output data samples and the feedback data samples are identified with a data block, and wherein the programmable processing array is configured to: receive subsets of data blocks identified with the data block, each one of the subsets of data blocks comprising a portion of the output data samples and a portion of the feedback data samples, which are concurrently received by the processing array; and compute the adapted DPD parameters using one of the subsets of data blocks having data samples that meet a predefined qualification criteria.

An example (e.g. example 23) is directed to a system on a chip (SoC), comprising: a storage means for (i) storing output data samples identified with a first data transmission, and (ii) storing feedback data samples obtained via a feedback measurement that is performed with respect to the first data transmission; a processing array means for computing adapted digital pre-distortion (DPD) parameters using (i) the output data samples, and (ii) the feedback data samples; and a hardware accelerator means for applying, to transmit (TX) data samples identified with a second data transmission, DPD terms in accordance with the adapted DPD parameters, wherein the output data samples and the feedback data samples are provided to the processing array means in a time-aligned manner based upon a base station frame number (BFN) counter.

Another example (e.g. example 24) relates to a previously-described example (e.g. example 23), wherein the output data samples comprise data samples that are input to the hardware accelerator means prior to the application of the DPD terms by the hardware accelerator means in accordance with the first data transmission.

Another example (e.g. example 25) relates to a previously-described example (e.g. one or more of examples 23-24), wherein the output data samples comprise data samples that are output by the hardware accelerator means after the application of the DPD terms by the hardware accelerator means in accordance with the first data transmission.

Another example (e.g. example 26) relates to a previously-described example (e.g. one or more of examples 23-25), further comprising: a hardwired digital front end (DFE) means comprising the hardware accelerator means, the hardwired DFE means comprising a multiplexer configured to selectively output, as the output data samples, one of (i) DPD parameters that are used by the hardware accelerator means to determine the applied DPD terms in accordance with the first data transmission, or (ii) the applied DPD terms that are determined by the hardware accelerator means using the DPD parameters associated with the first data transmission.

Another example (e.g. example 27) relates to a previously-described example (e.g. one or more of examples 23-26), further comprising: capture memory circuitry means comprising a base station frame number (BFN) counter/follower, the capture memory circuitry means storing the feedback data samples in the storage means time-correlated to the output data samples associated with the first data transmission.

Another example (e.g. example 28) relates to a previously-described example (e.g. one or more of examples 23-27), wherein the first data transmission is identified with a channel from among a plurality of different channels, and wherein the capture memory circuitry means stores the feedback data samples time-correlated to the output data samples associated with the channel used for the first data transmission.

Another example (e.g. example 29) relates to a previously-described example (e.g. one or more of examples 23-28), further comprising: a hardwired digital front end (DFE) means comprising a plurality of hardwired portions, each one of the plurality of hardwired portions comprising a respective hardware accelerator means coupled to a multiplexer network, and wherein each respective one of the multiplexer networks is configured to selectively provide, to the capture memory circuitry means, output data samples generated via a respectively coupled hardware accelerator means correlated to a respective base station frame number (BFN) counter time.

Another example (e.g. example 30) relates to a previously-described example (e.g. one or more of examples 23-29), wherein the capture memory circuitry means stores blocks of output data samples in a time-aligned manner over multiple clock cycles, each one of the multiple clock cycles being time-referenced to a respective base station frame number (BFN) counter time.

Another example (e.g. example 31) relates to a previously-described example (e.g. one or more of examples 23-30), wherein the processing array means computes the adapted DPD parameters using one of a subset of data blocks comprising a portion of the output data samples and a portion of feedback data samples that meet a predefined qualification criteria.

Another example (e.g. example 32) relates to a previously-described example (e.g. one or more of examples 23-31), wherein upon the processing array means determining that the portion of the output data samples and the portion of the feedback data samples meet the predefined qualification criteria, the one of the subset of data blocks is loaded into the processing array.

Another example (e.g. example 33) relates to a previously-described example (e.g. one or more of examples 23-32), wherein the output data samples and the feedback data samples are identified with a data block, and wherein the processing array means: receives subsets of data blocks identified with the data block, each one of the subsets of data blocks comprising a portion of the output data samples and a portion of the feedback data samples, which are concurrently received by the processing array means; and computes the adapted DPD parameters using one of the subsets of data blocks having data samples that meet a predefined qualification criteria.

An example (e.g. example 34) relates to a wireless device, comprising: a storage means for (i) storing output data samples identified with a first data transmission, and (ii) storing feedback data samples obtained via a feedback measurement that is performed with respect to the first data transmission; and a programmable processing array means for computing adapted digital pre-distortion (DPD) parameters using (i) the output data samples, and (ii) the feedback data samples; and a hardware accelerator means for applying, to transmit (TX) data samples identified with a second data transmission, DPD terms in accordance with the adapted DPD parameters, wherein the output data samples and the feedback data samples are provided to the programmable processing array in a time-aligned manner based upon a base station frame number (BFN) counter.

Another example (e.g. example 35) relates to a previously-described example (e.g. example 34), wherein the output data samples comprise DPD parameters that are input to the hardware accelerator means prior to the application of the DPD terms by the hardware accelerator means in accordance with the first data transmission.

Another example (e.g. example 36) relates to a previously-described example (e.g. one or more of examples 34-35), wherein the output data samples comprise data samples that are output by the hardware accelerator means after the application of the DPD terms by the hardware accelerator means in accordance with the first data transmission.

Another example (e.g. example 37) relates to a previously-described example (e.g. one or more of examples 34-36), further comprising: a hardwired digital front end (DFE) means comprising the hardware accelerator means, the hardwired DFE means comprising a multiplexer configured to selectively output, as the output data samples, one of (i) DPD parameters that are used by the hardware accelerator means to determine the applied DPD terms in accordance with the first data transmission, or (ii) the applied DPD terms that are determined by the hardware accelerator means using the DPD parameters associated with the first data transmission.

Another example (e.g. example 38) relates to a previously-described example (e.g. one or more of examples 34-37), further comprising: a capture memory circuitry means comprising a base station frame number (BFN) counter/follower, the capture memory circuitry means storing the feedback data samples in the memory time-correlated to the output data samples associated with the first data transmission.

Another example (e.g. example 39) relates to a previously-described example (e.g. one or more of examples 34-38), wherein the first data transmission is identified with a channel from among a plurality of different channels, and wherein the capture memory circuitry means stores feedback data samples time-correlated to the output data samples associated with the channel used for the first data transmission.

Another example (e.g. example 40) relates to a previously-described example (e.g. one or more of examples 34-39), further comprising: a hardwired digital front end (DFE) means comprising a plurality of hardwired portions, each one of the plurality of hardwired portions comprising a respective hardware accelerator means coupled to a multiplexer network, and wherein each respective one of the multiplexer networks is configured to selectively provide, to the capture memory circuitry means, output data samples generated via a respectively coupled hardware accelerator means correlated to a respective base station frame number (BFN) counter time.

Another example (e.g. example 41) relates to a previously-described example (e.g. one or more of examples 34-40), wherein the capture memory circuitry means stores blocks of output data samples in a time-aligned manner over multiple clock cycles, each one of the multiple clock cycles being time-referenced to a respective base station frame number (BFN) counter time.

Another example (e.g. example 42) relates to a previously-described example (e.g. one or more of examples 34-41), wherein the programmable processing array means computes the adapted DPD parameters using one of a subset of data blocks comprising a portion of the output data samples and a portion of feedback data samples that meet a predefined qualification criteria.

Another example (e.g. example 43) relates to a previously-described example (e.g. one or more of examples 34-42), wherein upon the processing array determining that the portion of the output data samples and the portion of the feedback data samples meet the predefined qualification criteria, the one of the subset of data blocks is loaded into the processing array.

Another example (e.g. example 44) relates to a previously-described example (e.g. one or more of examples 34-43), wherein the output data samples and the feedback data samples are identified with a data block, and wherein the programmable processing array means: receives subsets of data blocks identified with the data block, each one of the subsets of data blocks comprising a portion of the output data samples and a portion of the feedback data samples, which are concurrently received by the processing array; and computes the adapted DPD parameters using one of the subsets of data blocks having data samples that meet a predefined qualification criteria.

An apparatus as shown and described.

A method as shown and described.

CONCLUSION

The aforementioned description will so fully reveal the general nature of the disclosure that others can, by applying knowledge within the skill of the art, readily modify and/or adapt for various applications without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one implementation," "an implementation," "an exemplary implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementation described herein are provided for illustrative purposes, and are not limiting. Other implementation are possible, and modifications may be made to the described implementations. Therefore, the specification is not meant to limit the disclosure. Rather, the scope of the disclosure is defined only in accordance with the following claims and their equivalents.

The implementations described herein may be facilitated in hardware (e.g., circuits), firmware, software, or any combination thereof. Implementations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to implementations described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the implementations described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A system on a chip (SoC), comprising:
a memory configured to (i) store output data samples identified with a first data transmission, and (ii) store feedback data samples obtained via a feedback measurement that is performed with respect to the first data transmission;
a processing array configured to compute adapted digital pre-distortion (DPD) parameters using (i) the output data samples, and (ii) the feedback data samples; and
a hardware accelerator configured to apply, to transmit (TX) data samples identified with a second data transmission, DPD terms in accordance with the adapted DPD parameters,
wherein the output data samples and the feedback data samples are provided to the processing array in a time-aligned manner based upon a base station frame number (BFN) counter.

2. The SoC of claim 1, wherein the output data samples comprise data samples that are input to the hardware accelerator prior to the application of the DPD terms by the hardware accelerator in accordance with the first data transmission.

3. The SoC of claim 1, wherein the output data samples comprise data samples that are output by the hardware accelerator after the application of the DPD terms by the hardware accelerator in accordance with the first data transmission.

4. The SoC of claim 1, further comprising:
a hardwired digital front end (DFE) comprising the hardware accelerator, the hardwired DFE comprising a multiplexer configured to selectively output, as the output data samples, one of (i) DPD parameters that are used by the hardware accelerator to determine the applied DPD terms in accordance with the first data transmission, or (ii) the applied DPD terms that are determined by the hardware accelerator using the DPD parameters associated with the first data transmission.

5. The SoC of claim 1, further comprising:
capture memory circuitry comprising a BFN counter/follower, the capture memory circuitry being configured to store the feedback data samples in the memory time-correlated to the output data samples associated with the first data transmission.

6. The SoC of claim 5, wherein the first data transmission is identified with a channel from among a plurality of different channels, and wherein the capture memory circuitry is configured to store the feedback data samples time-correlated to the output data samples associated with the channel used for the first data transmission.

7. The SoC of claim 5, further comprising:

a hardwired digital front end (DFE) comprising a plurality of hardwired portions, each one of the plurality of hardwired portions comprising a respective hardware accelerator coupled to a multiplexer network, and wherein each respective one of the multiplexer networks is configured to selectively provide, to the capture memory circuitry, output data samples generated via a respectively coupled hardware accelerator correlated to a respective base station frame number (BFN) counter time.

8. The SoC of claim 5, wherein the capture memory circuitry is configured to store blocks of output data samples in a time-aligned manner over multiple clock cycles, each one of the multiple clock cycles being time-referenced to a respective base station frame number (BFN) counter time.

9. The SoC of claim 1, wherein the processing array is configured to compute the adapted DPD parameters using one of a subset of data blocks comprising a portion of the output data samples and a portion of feedback data samples that meet a predefined qualification criteria.

10. The SoC of claim 9, wherein upon the processing array determining that the portion of the output data samples and the portion of the feedback data samples meet the predefined qualification criteria, the one of the subset of data blocks is loaded into the processing array.

11. The SoC of claim 1, wherein the output data samples and the feedback data samples are identified with a data block, and wherein the processing array is configured to:

receive subsets of data blocks identified with the data block, each one of the subsets of data blocks comprising a portion of the output data samples and a portion of the feedback data samples, which are concurrently received by the processing array; and compute the adapted DPD parameters using one of the subsets of data blocks having data samples that meet a predefined qualification criteria.

12. A wireless device, comprising:

a memory configured to (i) store output data samples identified with a first data transmission, and (ii) store feedback data samples obtained via a feedback measurement that is performed with respect to the first data transmission; and a programmable processing array configured to compute adapted digital pre-distortion (DPD) parameters using (i) the output data samples, and (ii) the feedback data samples; and a hardware accelerator configured to apply, to transmit (TX) data samples identified with a second data transmission, DPD terms in accordance with the adapted DPD parameters, wherein the output data samples and the feedback data samples are provided to the programmable processing array in a time-aligned manner based upon a base station frame number (BFN) counter.

13. The wireless device of claim 12, wherein the output data samples comprise data samples that are input to the hardware accelerator prior to the application of the DPD terms by the hardware accelerator in accordance with the first data transmission.

14. The wireless device of claim 12, wherein the output data samples comprise data samples that are output by the hardware accelerator after the application of the DPD terms by the hardware accelerator in accordance with the first data transmission.

15. The wireless device of claim 12, further comprising:

a hardwired digital front end (DFE) comprising the hardware accelerator, the hardwired DFE comprising a multiplexer configured to selectively output, as the output data samples, one of (i) DPD parameters that are used by the hardware accelerator to determine the applied DPD terms in accordance with the first data transmission, or (ii) the applied DPD terms that are determined by the hardware accelerator using the DPD parameters associated with the first data transmission.

16. The wireless device of claim 12, further comprising:

capture memory circuitry comprising a BFN counter/follower, the capture memory circuitry being configured to store the feedback data samples in the memory time-correlated to the output data samples associated with the first data transmission.

17. The wireless device of claim 16, wherein the first data transmission is identified with a channel from among a plurality of different channels, and wherein the capture memory circuitry is configured to store the feedback data samples time-correlated to the output data samples associated with the channel used for the first data transmission.

18. The wireless device of claim 16, further comprising:

a hardwired digital front end (DFE) comprising a plurality of hardwired portions, each one of the plurality of hardwired portions comprising a respective hardware accelerator coupled to a multiplexer network, and wherein each respective one of the multiplexer networks is configured to selectively provide, to the capture memory circuitry, output data samples generated via a respectively coupled hardware accelerator correlated to a respective base station frame number (BFN) counter time.

19. The wireless device of claim 16, wherein the capture memory circuitry is configured to store blocks of output data samples in a time-aligned manner over multiple clock cycles, each one of the multiple clock cycles being time-referenced to a respective base station frame number (BFN) counter time.

20. The wireless device of claim 12, wherein the programmable processing array is configured to compute the adapted DPD parameters using one of a subset of data blocks comprising a portion of the output data samples and a portion of feedback data samples that meet a predefined qualification criteria.

21. The wireless device of claim 20, wherein upon the programmable processing array determining that the portion of the output data samples and the portion of the feedback data samples meet the predefined qualification criteria, the one of the subset of data blocks is loaded into the processing array.

22. The wireless device of claim 12, wherein the output data samples and the feedback data samples are identified with a data block, and wherein the programmable processing array is configured to:

receive subsets of data blocks identified with the data block, each one of the subsets of data blocks comprising a portion of the output data samples and a portion of the feedback data samples, which are concurrently received by the processing array; and compute the adapted DPD parameters using one of the subsets of data blocks having data samples that meet a predefined qualification criteria.

\* \* \* \* \*